United States Patent
Iida et al.

(10) Patent No.: US 7,588,843 B2
(45) Date of Patent: Sep. 15, 2009

(54) MAGNETIC RECORDING MEDIUM AND METHOD OF MAKING THE SAME

(75) Inventors: Koichi Iida, Kawasaki (JP); Kazuyuki Ozaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/726,534

(22) Filed: Mar. 22, 2007

(65) Prior Publication Data

US 2007/0224455 A1    Sep. 27, 2007

(30) Foreign Application Priority Data

Mar. 24, 2006  (JP)  ............................ 2006-082889
Sep. 27, 2006  (JP)  ............................ 2006-262555

(51) Int. Cl.
    *G11B 5/66*   (2006.01)
(52) U.S. Cl. ................... 428/831.2; 428/831; 428/832; 428/826
(58) Field of Classification Search ................. 428/827, 428/829, 848.5
    See application file for complete search history.

(56) References Cited

U.S. PATENT DOCUMENTS

| | | | |
|---|---|---|---|
| 6,174,597 B1 * | 1/2001 | Yusu et al. ................. | 428/332 |
| 7,173,788 B2 * | 2/2007 | Nakamura et al. ............ | 360/75 |
| 2002/0187368 A1 * | 12/2002 | Senzaki et al. ........... | 428/694 T |
| 2005/0214520 A1 * | 9/2005 | Oikawa et al. .............. | 428/323 |
| 2005/0219730 A1 | 10/2005 | Sakurai et al. | |
| 2008/0145522 A1 * | 6/2008 | Itoh et al. ................... | 427/129 |

FOREIGN PATENT DOCUMENTS

| JP | 2005-071467 | 3/2005 |
|---|---|---|
| JP | 2005-166115 | 6/2005 |
| JP | 2005-293730 | 10/2005 |

* cited by examiner

*Primary Examiner*—Kevin M. Bernatz
*Assistant Examiner*—Gary D. Harris
(74) *Attorney, Agent, or Firm*—Greer, Burns & Crain, Ltd

(57) ABSTRACT

A magnetic recording medium includes a continuous recording layer, and a seed layer including a surface held in contact with the recording layer. The seed layer includes an oxidized region and a non-oxidized region in the surface held in contact with the recording layer. The recording layer includes a recording magnetic region and a non-recording magnetic region. The recording magnetic region corresponds in position to the non-oxidized region and has perpendicular magnetic anisotropy. The non-recording magnetic region corresponds in position to the oxidized region.

7 Claims, 22 Drawing Sheets

FIG. 4
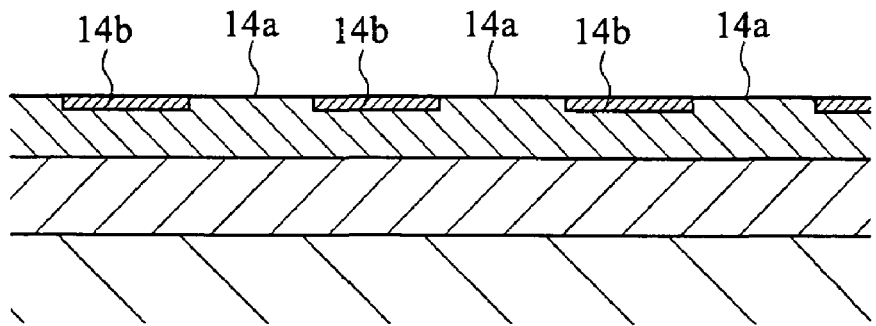
(a)
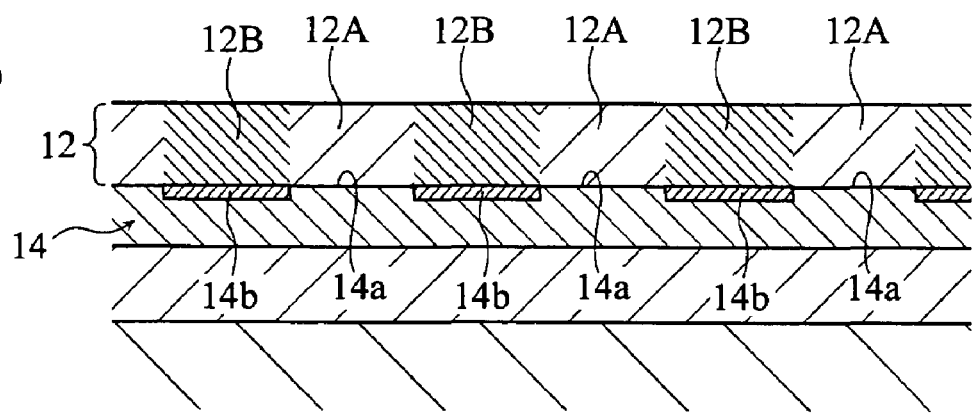
(b)
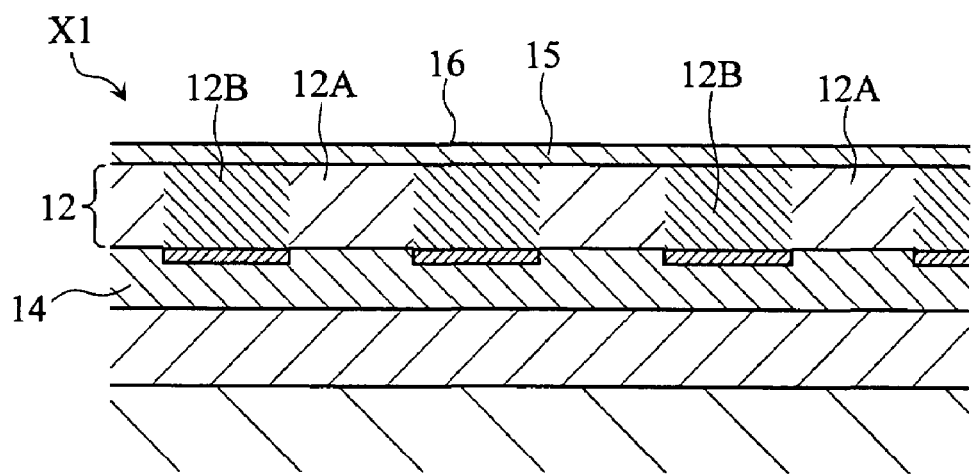
(c)

FIG. 6
(a) 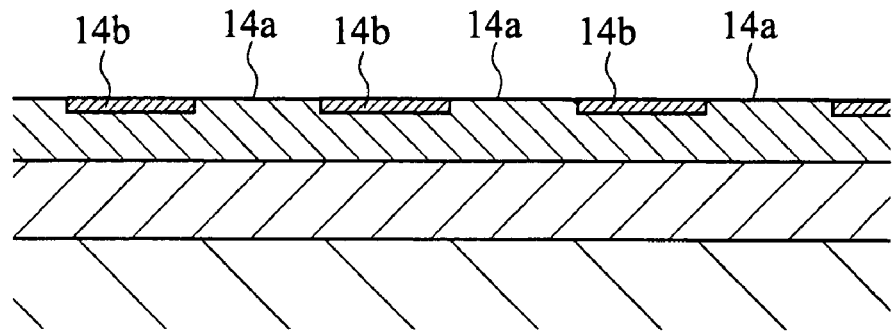
(b) 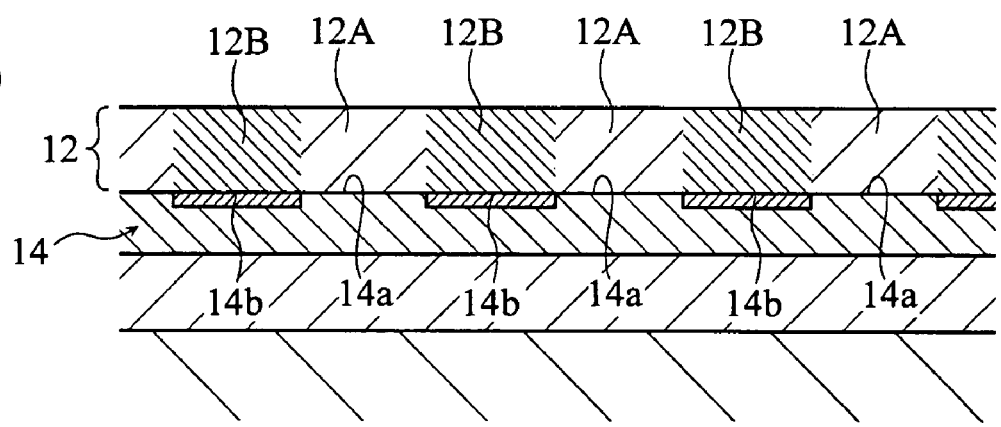
(c) 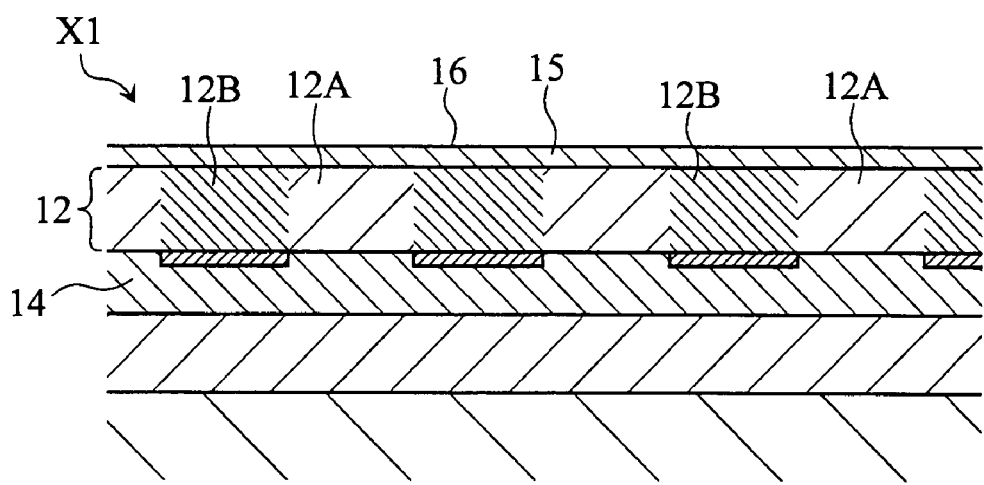

FIG. 7
(a)
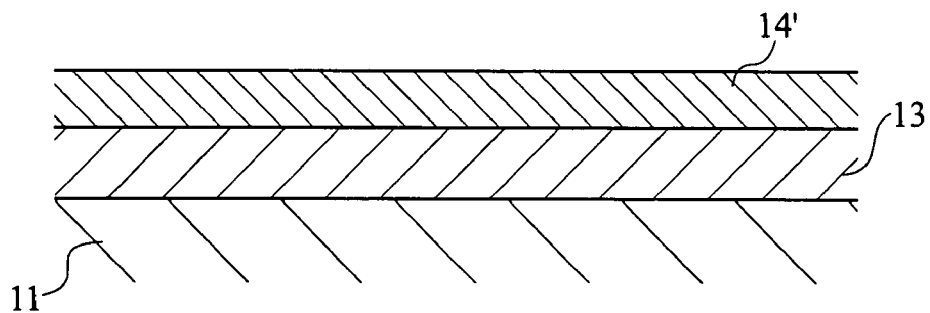
(b)
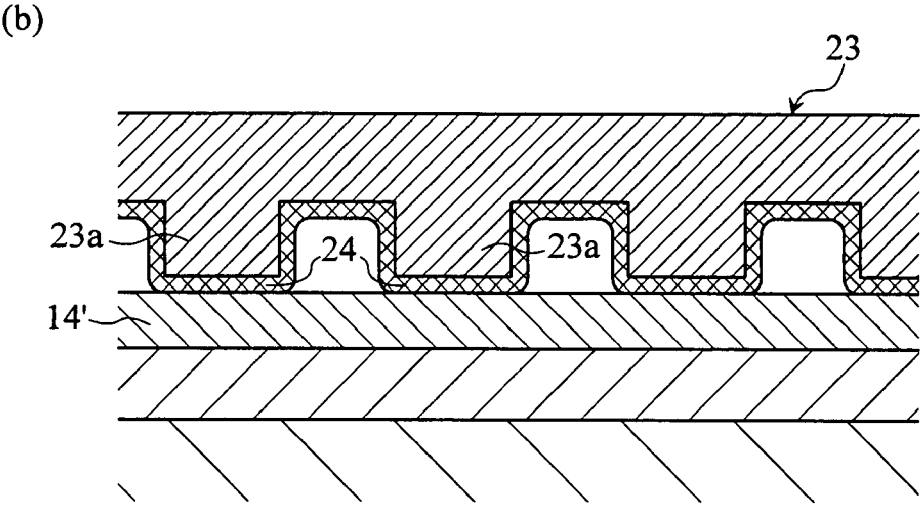
(c)
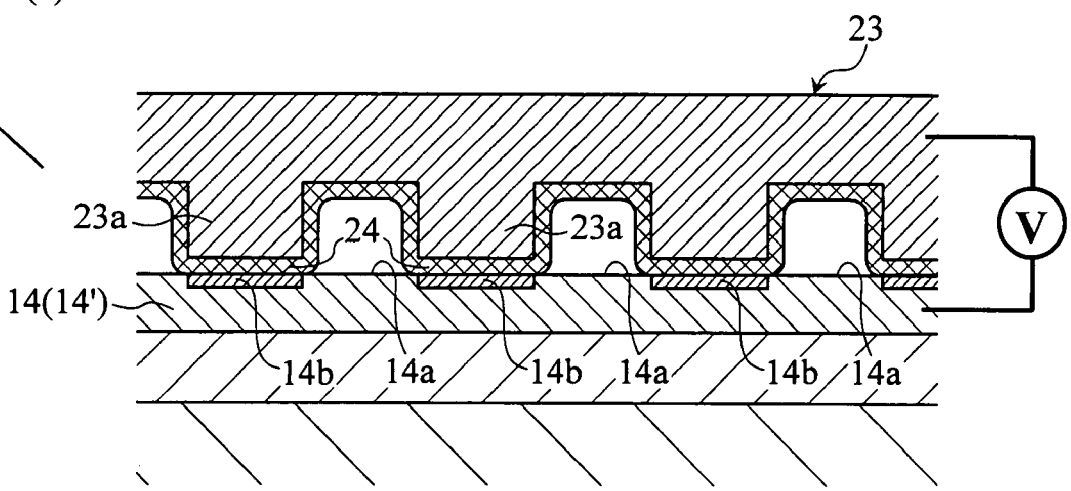

FIG. 8
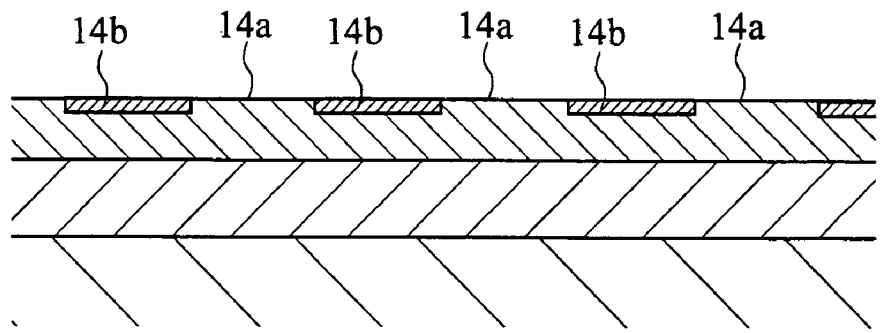
(a)
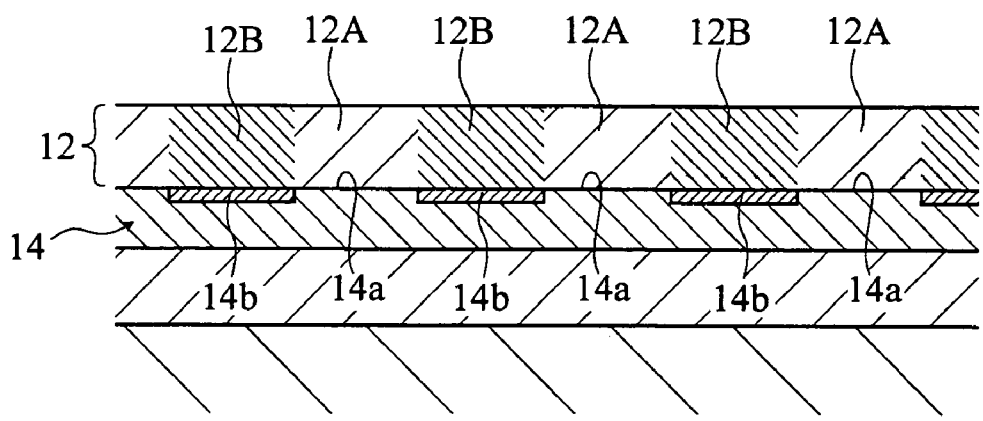
(b)
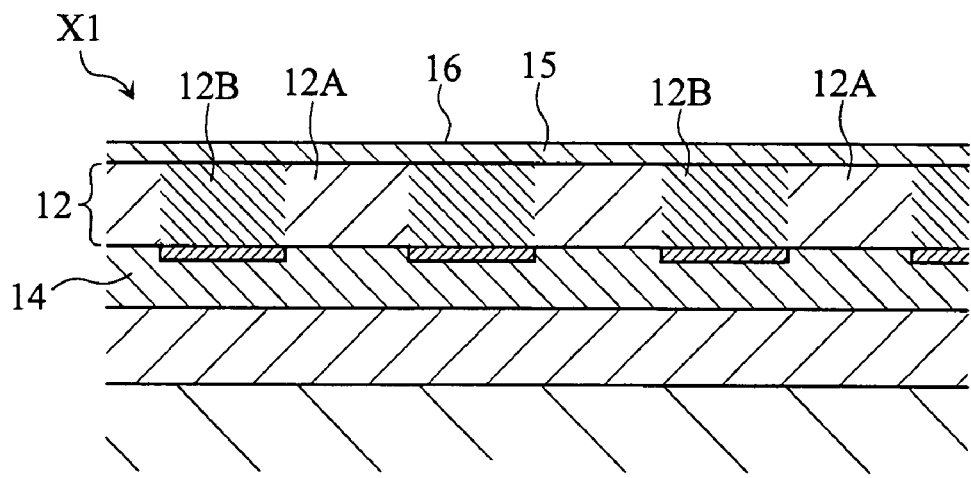
(c)

FIG. 10
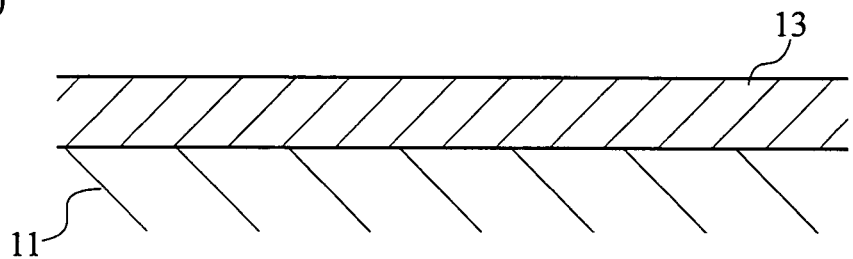
(a)
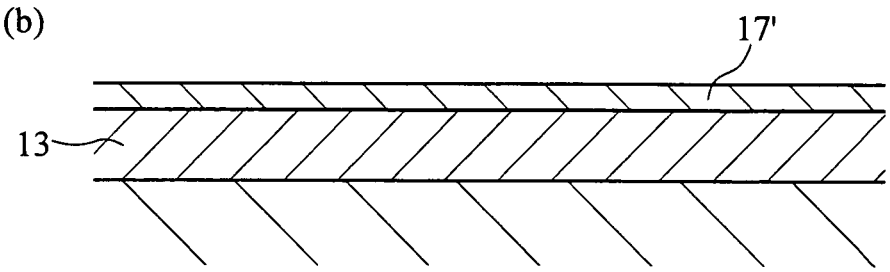
(b)
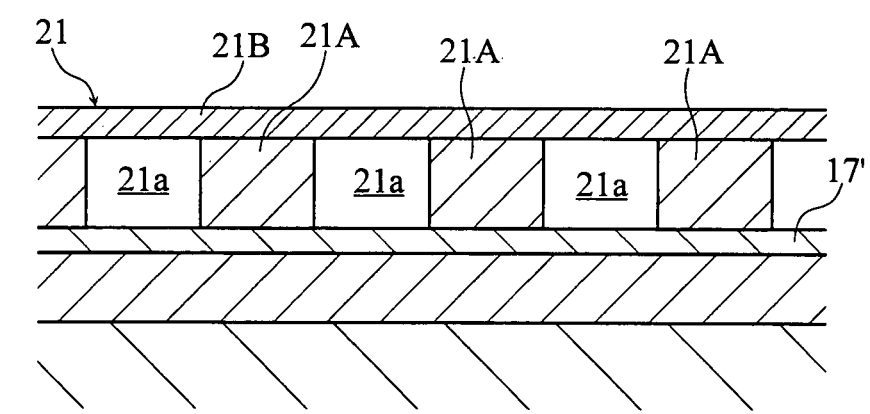
(c)
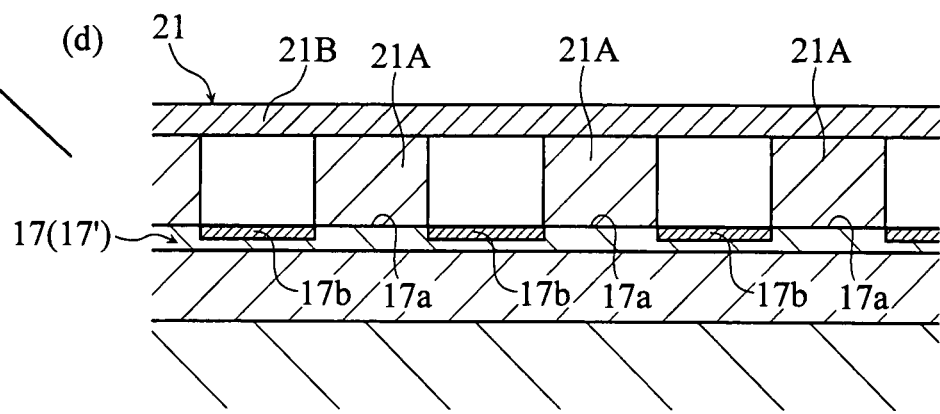
(d)

FIG. 14
(a)
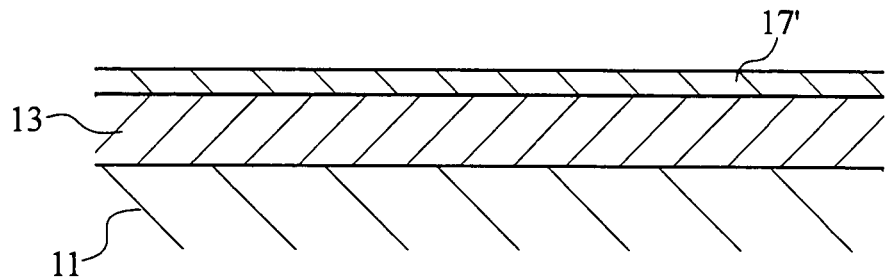
(b)
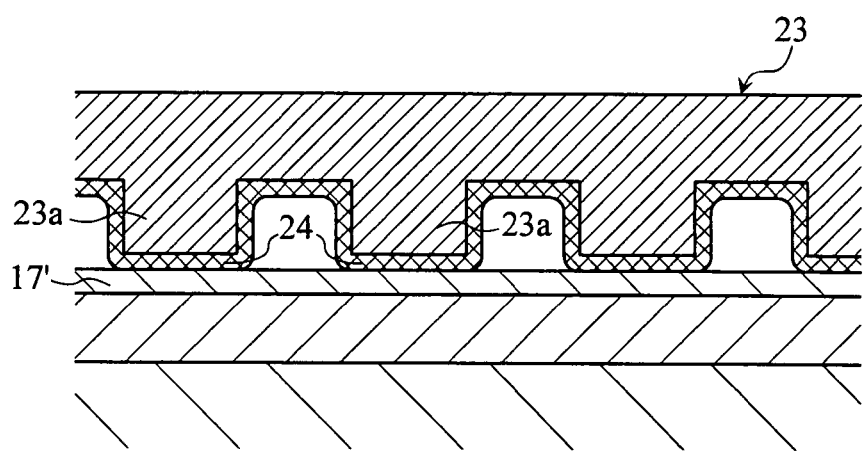
(c)
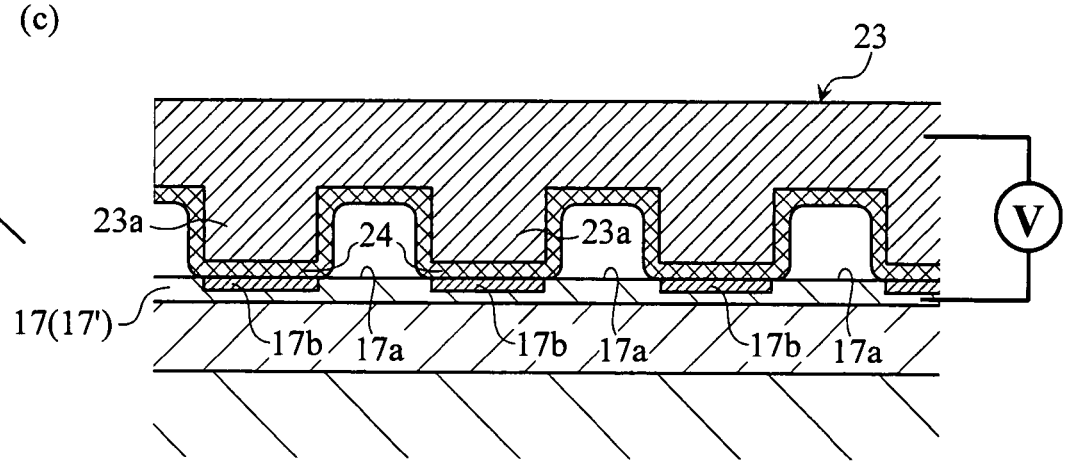

FIG. 19

| DLC Layer (2nm) |
| CoCrPt-SiO$_2$ (15nm) |
| Ru Layer (50nm) |
| CoZrNb Layer (100nm) |
| Glass Substrate |

FIG. 20

| DLC Layer (2nm) |
| CoCrPt-SiO$_2$ (15nm) |
| Ru Layer (20nm) |
| Ta Layer (5nm) |
| CoZrNb Layer (100nm) |
| Glass Substrate |

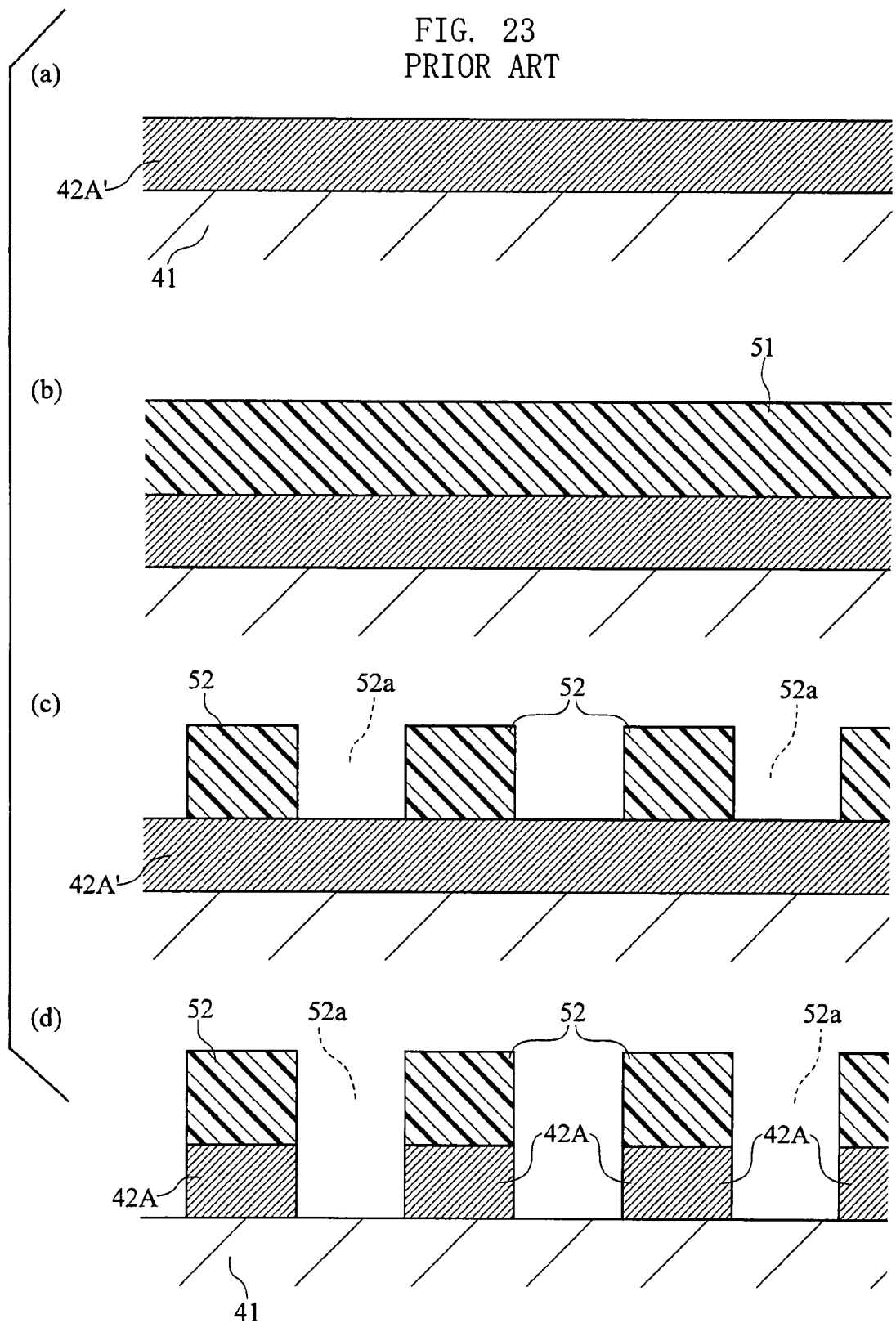

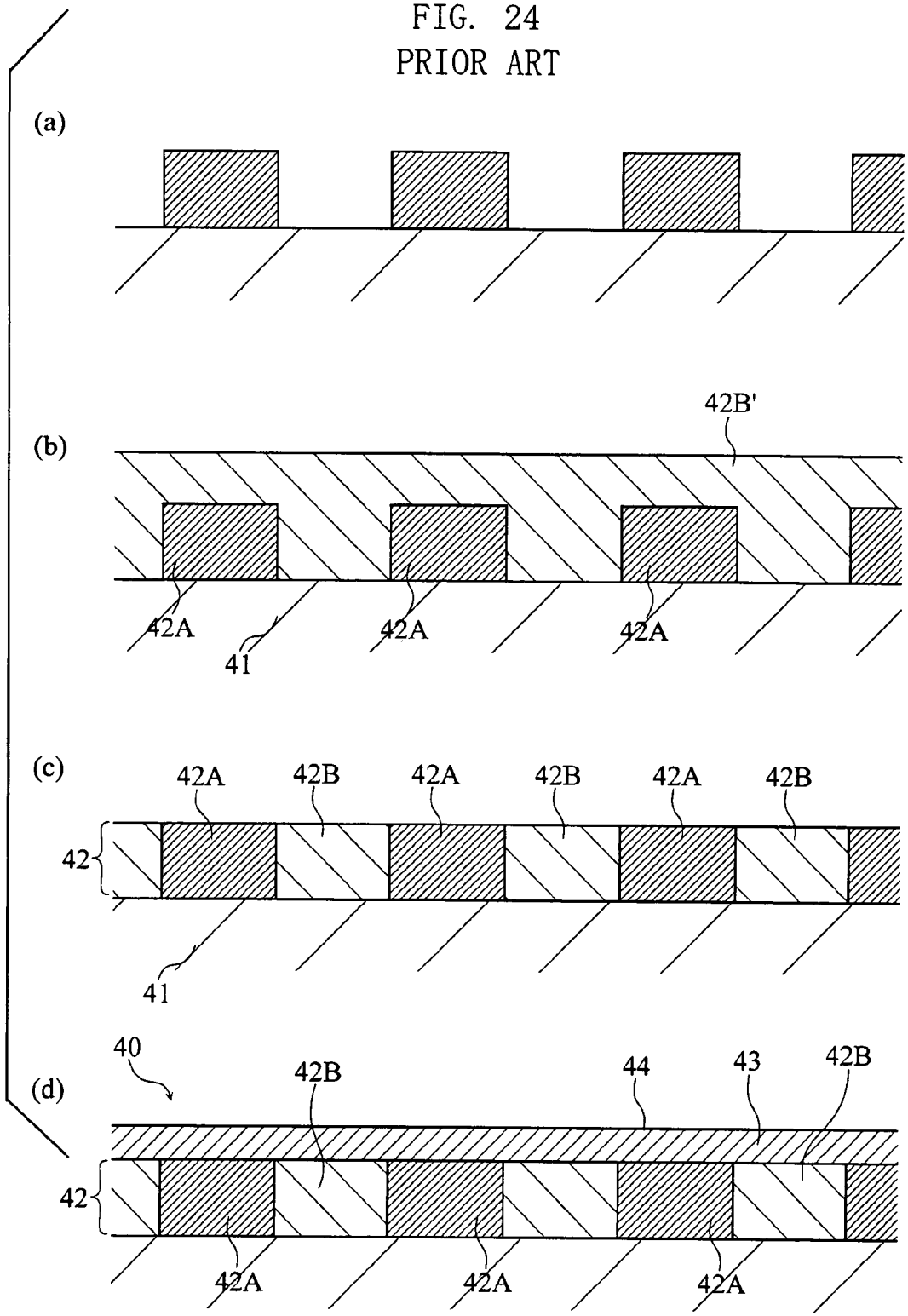

US 7,588,843 B2

MAGNETIC RECORDING MEDIUM AND METHOD OF MAKING THE SAME

BACKGROUND OF THE INVENTION

1. Field of the Invention

The present invention relates to a magnetic recording medium whose recording layer includes a recording magnetic region of a predetermined pattern. The present invention also relates to a method of making such a magnetic recording medium.

2. Description of the Related Art

A magnetic disk (magnetic recording medium) is well known as one of recording media that constitute storage apparatus such as a hard disk. The magnetic disk has a multilayer structure including a disk substrate and a recording layer with a predetermined magnetic structure. The ongoing increase in amount of information to be processed by a computer system is creating greater demand for a higher recording density from the magnetic disk.

When recording information on the magnetic disk, a magnetic head for recording is disposed close to a recording surface of the magnetic disk (so as to float thereabove), and the magnetic head applies to the recording layer a recording magnetic field stronger than the coercivity thereof. Sequentially reversing the direction of the recording magnetic field applied by the magnetic head while relatively moving the magnetic head with respect to the magnetic disk leads to formation of a plurality of recording marks (magnetic domains), alternately magnetized in opposite directions, aligned circumferentially of the disk-along an information track of the recording layer. Controlling the timing to reverse the direction of the recording magnetic field during this process enables forming each recording mark in a predetermined length. Thus on the recording layer, a predetermined signal or information is recorded based on variation of the magnetizing direction.

In the field of the magnetic disk, the magnetic disks including a recording layer having a recording magnetic region of a predetermined pattern have been developed for achieving higher recording density, such as a so-called discrete track medium (hereinafter, DTM) and patterned medium (PM). Such magnetic disks can be found, for example, in Patent documents 1 to 3 listed below.

Patent document 1: JP-A-2005-71467
Patent document 2: JP-A-2005-166115
Patent document 3: JP-A-2005-293730

FIGS. 21 and 22 depict a magnetic disk 40, which is the DTM. FIG. 21 is a plan view of the magnetic disk 40, and FIG. 32 is an enlarged fragmentary cross-sectional view taken along a radial direction of the magnetic disk 40.

The magnetic disk 40 has a multilayer structure including a disk substrate 41, a recording layer 42, and a cover layer 43 (not shown in FIG. 21). The recording layer 42 includes a plurality of recording magnetic regions 42A and a plurality of non-magnetic regions 42B. The recording magnetic regions 42A are concentrically disposed on the disk substrate 4 around a common center that coincides with the rotational axial center A' of the magnetic disk 40, as schematically partially indicated by bold lines in FIG. 21, thereby respectively constituting an information track. The non-magnetic regions 42B are interposed between the recording magnetic regions 42A. The exposed surface of the cover layer 43 constitutes a recording surface 44 of the magnetic disk 40.

When recording information on the magnetic disk 40 thus constructed, the recording magnetic head is disposed so as to float above the recording surface 44 of the magnetic disk 40 and applies the recording magnetic field, thus to create a plurality of recording marks (magnetic domains), alternately magnetized in opposite directions and serially aligned circumferentially of the disk, in one of the recording magnetic regions 42A of the recording layer 42.

FIGS. 23(a) to 24(d) depict a conventional manufacturing method of the magnetic disk 40. To manufacture the magnetic disk 40, firstly a predetermined magnetic material is deposited on the disk substrate 41 by a sputtering process for example, so that a magnetic film 42A' is formed as shown in FIG. 23(a). Then as shown in FIG. 23(b), a photoresist layer 51 is formed on the magnetic film 42A'. A lithography process is then performed so as to form a resist pattern 52 from the photoresist layer 51, as shown in FIG. 23(c). The resist pattern 52 is provided with openings 52a located according to the pattern of the non-magnetic region 42B of the recording layer 42. The resist pattern 52 also includes openings (not shown) located according to the pattern of the non-magnetic region 42B. To be more detailed, in the lithography process a predetermined pattern (latent image) is formed by exposure on the photoresist layer 51 with an exposure equipment, after which the photoresist layer 51 is developed. The resist pattern 52 is thus formed on the magnetic film 42A'. Proceeding to FIG. 23(d), a predetermined etching process is performed on the magnetic film 42A' utilizing the resist pattern 52 as the mask, to thereby delineate the pattern of the magnetic film 42A.

Proceeding to FIG. 24(a), the resist pattern 52 is removed. A non-magnetic material 42B' is then deposited as shown in FIG. 24(b). More specifically, for example a sputtering process is performed to deposit the non-magnetic material 42B' over the recording magnetic regions 42A including the gaps formed therebetween. Then as shown in FIG. 24(c), the non-magnetic material 42B' is partially removed by mechanical polishing except for a portion between the recording magnetic regions 42A. Upon completion of this process, the non-magnetic region 42B' is formed and thus the recording layer 42 is obtained. This is followed by deposition of a predetermined material on the recording layer 42, for example by a CVD or sputtering process, so that the cover layer 43 is formed as shown in FIG. 24(d). The foregoing process provides the magnetic disk 40 including the recording layer 42 having the recording magnetic region 42A of the predetermined pattern.

Such process, however, does not provide sufficient flatness on the recording surface 44. According to the foregoing process, after forming the recording magnetic region 42A in the predetermined pattern by etching on the magnetic film 42A' as described referring to FIG. 23(d), the non-magnetic material 42B' is deposited so as to fill in the gaps between the recording magnetic regions 42A as shown in FIG. 24(b), and then the mechanical polishing is performed to remove the excessive portion of the non-magnetic material 42B' is removed thus to form the recording layer 42 as shown in FIG. 24(c). The upper surface of the recording layer 42 thus formed is of a non-continuous film structure which is difficult to be formed with sufficient flatness, and since the surface flatness of the recording layer 42 is reflected in the recording surface 44, it is difficult to attain sufficient flatness on the recording surface 44.

Generally, the magnetic head that floats above the magnetic disk when recording or reproducing information is required to define a lower floating height (distance between the magnetic head and the recording surface), when the in-plane or longitudinal recording density of the magnetic disk, or more specifically the recording layer is higher. Accordingly, in order for the magnetic head to work properly at a lower floating height, the recording surface of the magnetic disk has to be sufficiently flat. Consequently, the lower the required floating height is (i.e. the higher the in-plane recording density is), the higher level of flatness is required from the recording surface.

However as already stated, the conventional manufacturing method as described above does not provide sufficient flatness on the recording layer 42, and hence the recording surface 44. The magnetic disk 40 obtained through such manufacturing method is, therefore, not desirable in reducing the floating height of the magnetic head, i.e. in attaining higher recording density.

Besides, the foregoing method is not suitable for mass production of the magnetic disk 40, from the viewpoint of production efficiency. According to the foregoing method, a predetermined thin film formation process is performed in a predetermined chamber set at a predetermined degree of vacuum, to form the magnetic film 42A' as shown in FIG. 23(*a*), to deposit the non-magnetic material 42B' as shown in FIG. 24(*b*), and to form the cover layer 43 as shown in FIG. 24(*d*). However, whereas the photoresist layer 51 has to be formed in a predetermined pattern and again the magnetic film 42A' has to be patterned by etching as described referring to FIG. 23(*d*), so as to obtain the recording magnetic region 42A from the magnetic film 42A', the magnetic disk under process has to be once taken out of the chamber after forming the magnetic film 42A' under a vacuum, when executing those processes. Further, whereas a polishing apparatus has to be employed for removing the excessive portion of the non-magnetic material 42B' as described referring to FIG. 24(*c*), the disk under process has to be taken out of the chamber after depositing the non-magnetic material 42B' under a vacuum, in order to execute the polishing. Thus, according to the foregoing method, the magnetic disk under process has to be taken out of the chamber between the formation of the magnetic film 42A' and deposition of the non-magnetic material 42B', as well as between the deposition of the non-magnetic material 42B' and formation of the cover layer 43, on the production line, which inhibits arranging an in-line production process that includes these series of steps. The foregoing method is, consequently, undesirable when executing mass production of the magnetic disk 40, because those series of steps cannot be arranged in a successive line.

In addition, the step relevant to FIG. 24(*b*) requires depositing a considerable amount of material has to be deposited to form the non-magnetic material 42B', and the step relevant to FIG. 24(*c*) imposes severe technical difficulty in detecting that the mechanical polishing has been performed to the level of the upper surface of the recording magnetic region 42A and stopping the polishing action at that moment. These are additional disadvantages in adopting the foregoing method for mass production of the magnetic disk 40.

SUMMARY OF THE INVENTION

The present invention has been proposed in the above-described situation. It is therefore an object of the present invention to provide a magnetic recording medium with a sufficiently flat recording surface, including a recording layer having a recording magnetic region of a predetermined pattern. Another object of the present invention is to provide a method of making a magnetic recording medium of the above-described type.

A first aspect of the present invention provides a method of manufacturing a magnetic recording medium. The method comprises forming a seed layer (seed layer formation step), oxidizing a partial region on a surface of the seed layer (pattern oxidation step), and growing a magnetic material on the seed layer, to thereby form a recording layer including a recording magnetic region having perpendicular magnetic anisotropy on a non-oxidized region on the surface of the seed layer, and a non-recording magnetic region on the oxidized region on the surface of the seed layer (recording layer formation step). The seed layer according to the present invention is constituted of a material capable of forming, on the surface thereof, a crystal plane or a crystal structure that achieves lattice matching with a crystal plane of a magnetic film formed by epitaxially growing a predetermined magnetic material on a non-oxidized ground of the seed layer, thereby controlling the magnetic easy axis of the magnetic film to be perpendicular to the film surface. For example, when the recording layer is constituted of a magnetic material having a hexagonal closest packed structure, the seed layer is constituted of a material capable of forming on the surface thereof a crystal plane or a crystal structure that achieves lattice matching with the crystal plane having the hexagonal closest packed structure, thereby controlling for example the c-axis of the hexagonal closest packed structure to be vertical. When the recording layer is constituted of a magnetic material having the hexagonal closest packed structure, it is preferable to employ a material having the hexagonal closest packed structure to constitute the seed layer.

Through the seed layer formation step in the foregoing method, the seed layer can obtain on its surface the crystal plane or crystal structure that orients the magnetic easy axis of the magnetic film, constituted of the magnetic material for the recording layer, in a vertical direction. The pattern oxidation step allows oxidizing a partial region of a predetermined pattern on the seed layer (i.e. oxidizing the surface of the seed layer in a predetermined pattern), thereby forming an oxidized region of the predetermined pattern and a non-oxidized region of the predetermined pattern, on the seed layer surface. Then in the recording layer formation step, upon growing the magnetic material on the seed layer thus processed, the recording layer including the recording magnetic region and the non-recording magnetic region can be obtained. On the non-oxidized region on the seed layer surface during the recording layer formation step, the magnetic material epitaxially grows under a lattice matching with the crystal plane on the seed layer ground, so that the magnetic easy axis of the magnetic film is controlled to be vertically oriented, and thus the recording magnetic region having perpendicular magnetic anisotropy is obtained. In contrast, on the oxidized region on the seed layer surface during the recording layer formation step, the magnetic material inhibited from the lattice matching with the crystal plane on the seed layer ground by the oxidized coating randomly grows (non-epitaxial growth), so that a non-recording magnetic region in which a plurality of magnetic easy axes is randomly oriented (i.e. which does not have perpendicular magnetic anisotropy) is formed. Also, the foregoing method enables forming the recording layer which includes such recording magnetic region and non-recording magnetic region in a form of a continuous film structure, by a thin film formation technique such as a sputtering process. When forming the continuous film structure by a thin film formation technique, smaller surface unevenness i.e. higher surface flatness can be achieved than the non-continuous film structure as the recording layer 42 of the conventional magnetic disk 40. Accordingly, the proposed method is appropriate for attaining sufficient flatness on the recording surface that reflects the surface flatness of the recording layer. Thus, the magnetic recording medium manufacturing method according to the first aspect of the present invention is appropriate for fabricating a magnetic recording medium with a sufficiently flat recording surface, including a recording layer having a recording magnetic region of a predetermined pattern. The magnetic recording medium having the sufficiently flat recording surface is desirable in reducing the floating height of the magnetic head, and hence in increasing the recording density.

Further, the foregoing method is appropriate for an in-line arrangement. Through the seed layer formation step and the recording layer formation step according to the proposed method, the predetermined thin film formation process is performed in the predetermined chamber set at the predetermined degree of vacuum. The pattern oxidation step between the seed layer formation step and the recording layer formation step may be carried out by exposing to oxygen a part of the seed layer surface of the disk under process that has undergone the seed layer formation step, or exposing to oxygen the entire seed layer surface of the disk under process that has undergone the seed layer formation step and then partially reducing the oxidized surface of the seed layer, or bringing an oxygen supplying substance (solid) into contact with a part of the seed layer surface of the disk under process that has undergone the seed layer formation step thus oxidizing the contact region. These processes of the pattern oxidation step can be successively performed in the chamber following the seed layer formation step, and in the same chamber the pattern oxidation step can be followed by the recording layer formation step. Accordingly, the foregoing method eliminates the need to take out the disk under process from the chamber between the seed layer formation step and the recording layer formation step, thereby facilitating arranging the series of steps from the seed layer formation step to the recording layer formation step in a single line. The method according to the present invention is, therefore, appropriate for efficiently fabricating the magnetic recording medium including the recording layer having the recording magnetic region of the predetermined pattern.

Thus, the magnetic recording medium manufacturing method according to the first aspect of the present invention is appropriate for fabricating with high efficiency a magnetic recording medium with a sufficiently flat recording surface, including a recording layer having a recording magnetic region of a predetermined pattern.

A second aspect of the present invention provides another method of manufacturing a magnetic recording medium. The method comprises forming a pre-seed layer (pre-seed layer formation step), forming a seed layer on the pre-seed layer (seed layer formation step), oxidizing a partial region on a surface of the pre-seed layer (pattern oxidation step), and growing a magnetic material on the seed layer, to thereby form a recording layer including a recording magnetic region having perpendicular magnetic anisotropy on a non-oxidized region on the surface of the pre-seed layer, and a non-recording magnetic region on the oxidized region on the surface of the pre-seed layer (recording layer formation step). The pre-seed layer according to the present invention serves to orient the azimuth of a crystal plane of a film constituted of a predetermined material, grown on the non-oxidized ground of the pre-seed layer, in a predetermined direction. The pre-seed layer of the present invention also serves to inhibit the crystal structure of an underlying layer below the pre-seed layer (for example a soft magnetic layer) from unduly interfering in the orientation of the crystal structure and the magnetic easy axis of the seed layer. From the viewpoint of the latter function, in particular, it is preferable to employ a non-crystalline material for the pre-seed layer.

The pre-seed layer formation step in the foregoing method allows forming, at least on the surface of the pre-seed layer, a structure that orients a crystal plane of a film constituted of the material for the seed layer in a predetermined direction. The pattern oxidation step allows oxidizing a partial region of a predetermined pattern on the pre-seed layer (i.e. oxidizing the surface of the pre-seed layer in a predetermined pattern), thereby forming an oxidized region of the predetermined pattern and a non-oxidized region of the predetermined pattern, on the pre-seed layer surface. In the seed layer formation step, the pattern of the oxidized region and the non-oxidized region on the pre-seed layer surface is reflected, so that the seed layer having the azimuth of the crystal plane on it surface oriented in the predetermined pattern is obtained. To be more detailed, in the seed layer formation step, based on the fact that on the non-oxidized region of the pre-seed layer surface the material of the seed layer tends to grow with the crystal plane well aligned while on the oxidized region of the pre-seed layer surface the material of the seed layer barely achieves the alignment of the crystal plane, the seed layer surface can be provided with a first region (which reflects the non-oxidized region of the pre-seed layer surface) having the crystal plane or crystal structure that orients the magnetic easy axis of the magnetic film constituted of the magnetic material for the recording layer in a vertical direction, and a second region (which reflects the oxidized region of the pre-seed layer surface) where the magnetic easy axis of the magnetic film constituted of the magnetic material for the recording layer cannot be vertically oriented. Then in the recording layer formation step, upon growing the magnetic material on the seed layer thus processed, the recording layer including the recording magnetic region and the non-recording magnetic region can be obtained. On the first region on the seed layer surface (corresponding to the non-oxidized region of the pre-seed layer surface) during the recording layer formation step, the magnetic material epitaxially grows under a lattice matching with the crystal plane on the seed layer ground, so that the magnetic easy axis of the magnetic film is controlled to be vertically oriented, and thus the recording magnetic region having perpendicular magnetic anisotropy is obtained. In contrast, on the second region on the seed layer surface (corresponding to the oxidized region of the pre-seed layer surface) during the recording layer formation step, the magnetic material inhibited from the lattice matching with the crystal plane on the seed layer ground randomly grows (non-epitaxial growth), so that a non-recording magnetic region in which a plurality of magnetic easy axes is randomly oriented (i.e. which does not have perpendicular magnetic anisotropy) is formed. Also, the foregoing method enables forming the recording layer which includes such recording magnetic region and non-recording magnetic region in a form of a continuous film structure, by a thin film formation technique such as a sputtering process. When forming the continuous film structure by a thin film formation technique, smaller surface unevenness i.e. higher surface flatness can be achieved than the non-continuous film structure as the recording layer 42 of the conventional magnetic disk 40. Accordingly, the proposed method is appropriate for attaining sufficient flatness on the recording surface that reflects the surface flatness of the recording layer. Thus, the magnetic recording medium manufacturing method according to the second aspect of the present invention is appropriate for fabricating a magnetic recording medium with a sufficiently flat recording surface, including a recording layer having a recording magnetic region of a predetermined. The magnetic recording medium having the sufficiently flat recording surface is desirable in reducing the floating height of the magnetic head, and hence in increasing the recording density.

Further, the foregoing method is appropriate for an in-line arrangement. Through the pre-seed layer formation step, the seed layer formation step and the recording layer formation step according to the proposed method, the predetermined thin film formation process is performed in the predetermined chamber set at the predetermined degree of vacuum. The pattern oxidation step between the pre-seed layer formation step and the seed layer formation step may be carried out by exposing to oxygen a part of the pre-seed layer surface of the disk under process that has undergone the pre-seed layer formation step, or exposing to oxygen the entire pre-seed layer surface of the disk under process that has undergone the pre-seed layer formation step and then partially reducing the oxidized surface of the pre-seed layer, or bringing an oxygen supplying substance (solid) into contact with a part of the pre-seed layer surface of the disk under process that has undergone the pre-seed layer formation step thus oxidizing the contact region. These processes of the pattern oxidation step can be successively performed in the chamber following the pre-seed layer formation step, and in the same chamber the pattern oxidation step can be followed by the seed layer formation step. Accordingly, the foregoing method eliminates the need to take out the disk under process from the chamber between the pre-seed layer formation step and the recording layer formation step, thereby facilitating arranging the series of steps from the pre-seed layer formation step to the recording layer formation step in a single line. The method according to the present invention is, therefore, appropriate for efficiently fabricating the magnetic recording medium including the recording layer having the recording magnetic region of the predetermined pattern.

Thus, the magnetic recording medium manufacturing method according to the second aspect of the present invention is appropriate for fabricating with high efficiency a magnetic recording medium with a sufficiently flat recording surface, including a recording layer having a recording magnetic region of a predetermined pattern.

A third aspect of the present invention provides a magnetic recording medium. The magnetic recording medium has a multilayer structure including a recording layer of a continuous film structure, and a seed layer. The seed layer includes an oxidized region and a non-oxidized region on a surface opposing the recording layer. The recording layer includes a recording magnetic region having perpendicular magnetic anisotropy and located on the non-oxidized region on the seed layer surface, and a non-recording magnetic region located on the oxidized region on the seed layer surface.

Such magnetic recording medium may be fabricated by the magnetic recording medium manufacturing method according to the first aspect of the present invention. When manufacturing this magnetic recording medium the technical advantages described with reference to the first aspect of the present invention can be implemented, and therefore the magnetic recording medium according to the third aspect, including the recording layer having the recording magnetic region of the predetermined pattern, facilitates achieving high-level flatness on the recording surface.

A fourth aspect of the present invention provides another magnetic recording medium. The magnetic recording medium has a multilayer structure including a recording layer of a continuous film structure, a pre-seed layer, and a seed layer provided between the recording layer and the pre-seed layer. The pre-seed layer includes an oxidized region and a non-oxidized region on a surface opposing the seed layer. The recording layer includes a recording magnetic region having perpendicular magnetic anisotropy in a region corresponding to the non-oxidized region on the pre-seed layer surface, and a non-recording magnetic region in a region corresponding to the oxidized region on the pre-seed layer surface.

Such magnetic recording medium may be fabricated by the magnetic recording medium manufacturing method according to the second aspect of the present invention. When manufacturing this magnetic recording medium the technical advantages described with reference to the second aspect of the present invention can be implemented, and therefore the magnetic recording medium according to the fourth aspect, including the recording layer having the recording magnetic region of the predetermined pattern, facilitates achieving high-level flatness on the recording surface.

The recording layer according to the present invention may preferably be constituted of a magnetic material containing Co, and more preferably, of $CoCrPt$—$SiO_2$, $CoCr$—$SiO_2$, or $CoPt$—$SiO_2$—. These materials allow forming the recording layer having a hexagonal closest packed structure.

Preferably, the seed layer according to the present invention may be constituted of a single metal selected from the group consisting of Ru, Pt, Pd, and Ti, or an alloy containing any of those metals. These materials are capable of forming, on the surface of the seed layer, a crystal plane or crystal structure that achieves lattice matching with a crystal plane of the hexagonal closest packed structure of the recording layer, thereby orienting the c-axis of the hexagonal closest packed structure in a vertical direction. When employing one of those materials for the seed layer, it is preferable to employ a single metal selected from the group consisting of Ta, Pt, Ni, Fe, Ti, W, Mo, B, C, Si, and Ge or a compound containing a chemical species thereof, for constituting the pre-seed layer according to the second and the fourth aspect of the present invention.

Preferably, the non-recording magnetic region according to the present invention may have longitudinal magnetic anisotropy. Such structure is desirable in restricting a reproduction signal detector or a reproduction magnetic head from detecting a magnetic flux originating from the non-recording magnetic region, when reproducing information by the magnetic recording medium based on perpendicular magnetic recording system according to the present invention, thereby suppressing a noise.

BRIEF DESCRIPTION OF THE DRAWINGS

FIG. 4 is a cross-sectional view showing the steps following FIG. 3;

FIG. 6 is a cross-sectional view showing the steps following FIG. 5;

FIG. 7 is a cross-sectional view sequentially showing a manufacturing process of the magnetic disk of FIG. 1, according to a third method;

FIG. 8 is a cross-sectional views showing the steps following FIG. 7;

FIG. 10 is a cross-sectional view sequentially showing a manufacturing process of the magnetic disk of FIG. 9, according to a first method;

FIG. 14 is a cross-sectional view sequentially showing a manufacturing process of the magnetic disk of FIG. 9, according to a third method;

FIG. 19 is a diagram showing a multilayer structure according to the working examples 8, 9;

FIG. 20 is a diagram showing a multilayer structure according to the working example 10;

FIG. 23 is a cross-sectional view sequentially showing a manufacturing process of the magnetic disk of FIG. 21; and FIG. 24 is a cross-sectional view showing the steps following FIG. 23.

DETAILED DESCRIPTION OF THE PREFERRED EMBODIMENTS

Figure 1:
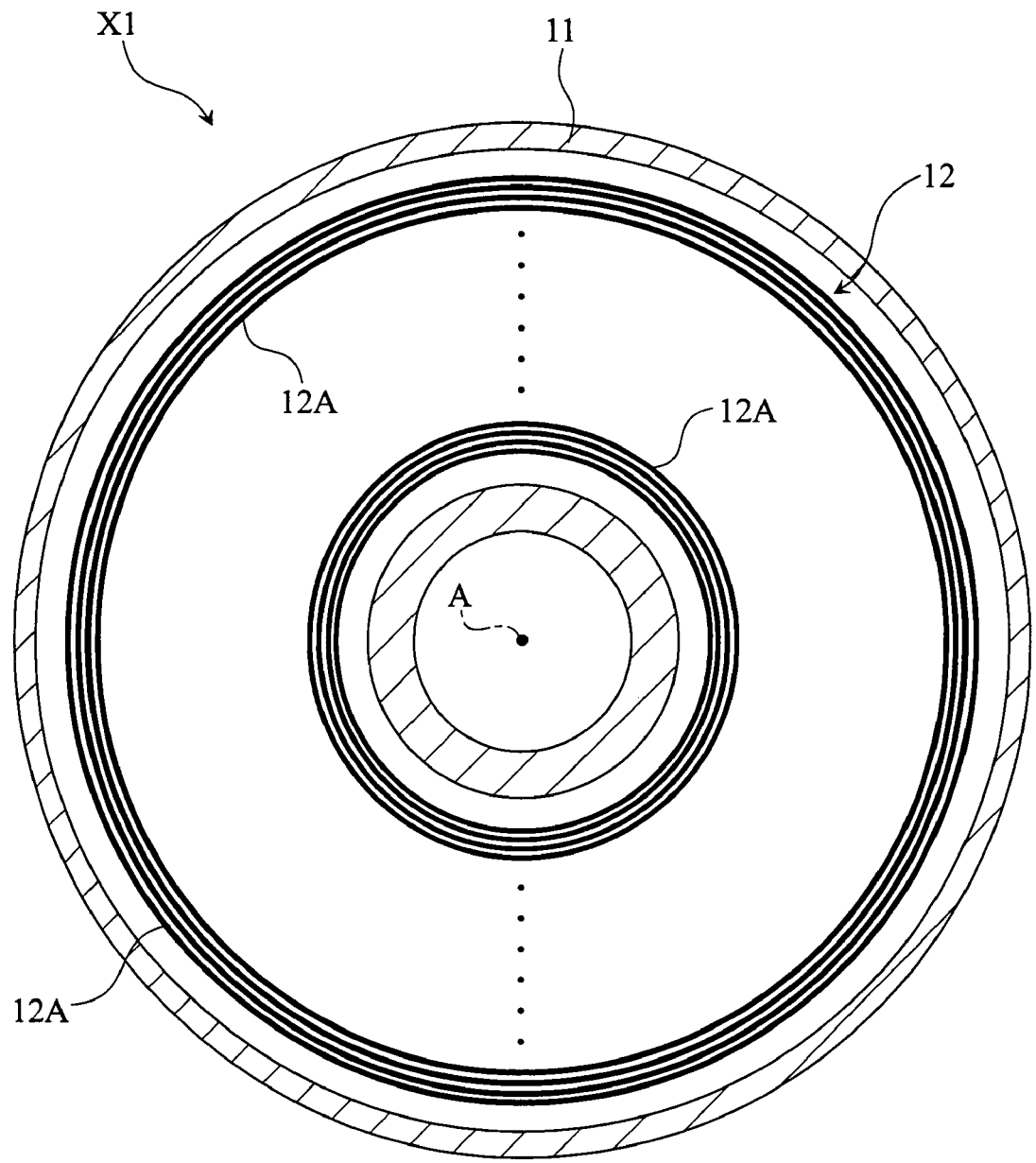
FIG. 1 is a plan view showing a magnetic disk according to a first embodiment of the present invention
Figure 2:
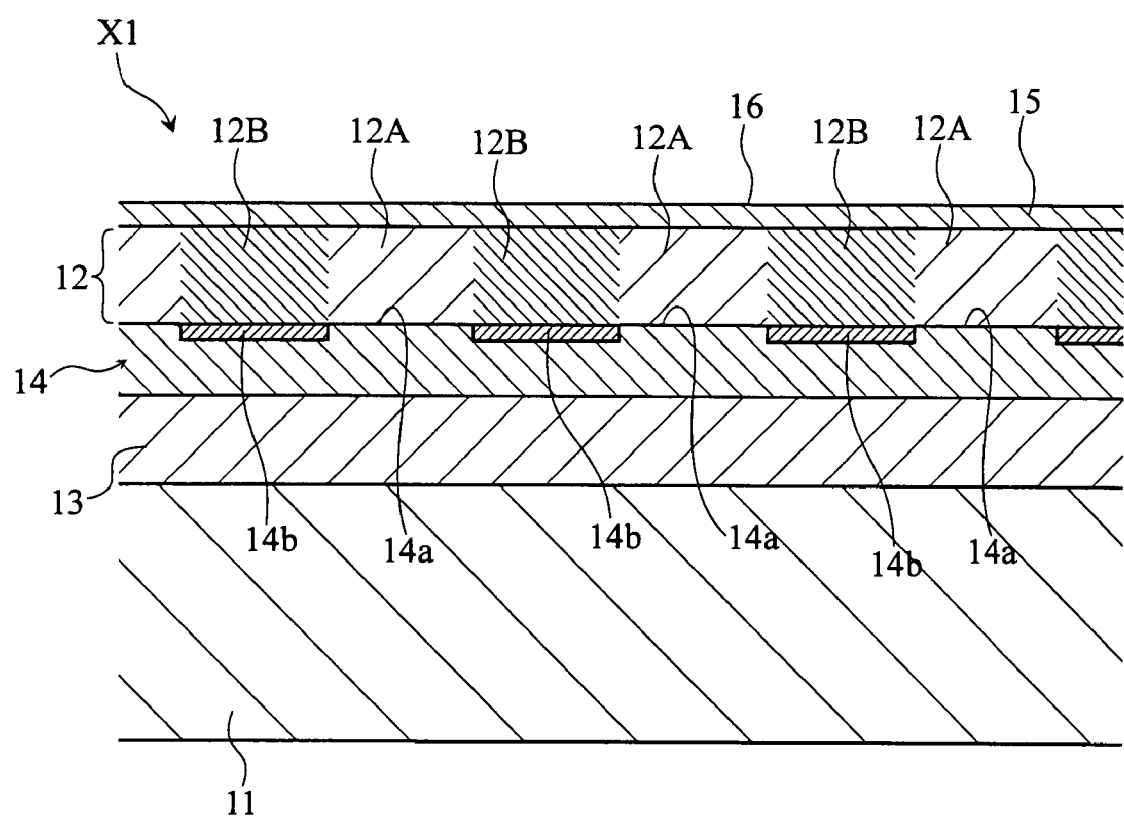
FIG. 2 is an enlarged fragmentary cross-sectional view of the magnetic disk shown in FIG. 1.

FIGS. 1 and 2 depict a magnetic disk X1 according to a first embodiment of the present invention. FIG. 1 is a plan view of the magnetic disk X1, and FIG. 2 is an enlarged fragmentary cross-sectional view taken radially of the magnetic disk X1 shown in FIG. 1.

The magnetic disk X1 has a multilayer structure including a disk substrate 11, a recording layer 12, a soft magnetic layer 13, a seed layer 14, and a cover layer 15 (not shown in FIG. 1), configured as a discrete track medium.

The disk substrate 11 primarily serves to secure sufficient rigidity of the magnetic disk X1, and may be constituted of an aluminum alloy, glass, or a resin.

The recording layer 12 includes a plurality of recording magnetic regions 12A and a plurality of non-recording magnetic regions 12B, as shown in FIG. 2. The recording magnetic regions 12A are concentrically disposed around a common center that coincides with the rotational axial center A of the magnetic disk X1, as schematically partially indicated by bold lines in FIG. 1, thereby respectively constituting an information track with perpendicular magnetic anisotropy. The non-recording magnetic regions 12B are randomly magnetized, and interposed between the recording magnetic regions 12A. The recording layer 12 is of a continuous film structure and, hence, the recording magnetic regions 12A and the non-recording magnetic regions 12B are constituted of the same material. To constitute the recording layer 12, it is preferable to employ a magnetic material predominantly containing Co. Examples of such magnetic material include $CoCrPt$—$SiO_2$, $CoCr$—$SiO_2$, and $CoPt$—$SiO_2$. These magnetic materials are capable of forming a crystal structure of a hexagonal closest packed structure. These magnetic materials are also capable of achieving a granular structure having the perpendicular magnetic anisotropy. The recording layer 12 may have a thickness of 5 to 50 nm; the recording magnetic region 12A may have a width of 30 to 200 nm; and the non-recording magnetic region 12B may have a width of 20 to 100 nm.

The soft magnetic layer 13 serves to efficiently create a magnetic path through which a magnetic flux from the magnetic head that works in a recording process is to be returned to the magnetic head, and is constituted of a soft magnetic material having high magnetic permeability, large saturation magnetization and small coercivity. Suitable soft magnetic materials for constituting the soft magnetic layer 13 include CoZrNb, FeC, FeNi, FeCoB, FeCoSiC, and FeCo—AlO. The soft magnetic layer 13 may have a thickness of 20 to 200 nm.

The seed layer 14, which includes a non-oxidized region 14a and an oxidized region 14b on its surface opposing the recording layer 12, serves to control the magnetization status of the respective positions in the recording layer 12. Specifically, the seed layer 14 is constituted of a material capable of forming, on the surface thereof, a crystal plane or a crystal structure that achieves lattice matching with a crystal plane of a magnetic film formed by epitaxially growing a predetermined magnetic material on the non-oxidized ground of the seed layer, thereby controlling the magnetic easy axis of the magnetic film to be perpendicular to the film surface. For example, when the recording layer 12 is constituted of a magnetic material having the hexagonal closest packed structure, the seed layer 14 is constituted of a material capable of forming on the surface thereof a crystal plane or a crystal structure that achieves lattice matching with the crystal plane of the hexagonal closest packed structure, thereby orienting for example the c-axis of the hexagonal closest packed structure in a vertical direction. Suitable materials for the seed layer 14 include a single metal selected from the group consisting of Ru, Pt, Pd, and Ti, or an alloy containing any of those metals. The non-oxidized region 14a has a pattern shape corresponding to the recording magnetic region 12A in the recording layer 12, and the oxidized region 14b has a pattern shape corresponding to the non-recording magnetic region 12B. In other words, the recording magnetic region 12A in the recording layer 12 is located on the non-oxidized region 14a, and the non-recording magnetic region 12B is located on the oxidized region 14b. The seed layer 14 thus configured may have a thickness of 10 to 50 nm.

The cover layer 15 serves to physically and chemically protect the recording layer 12 and the soft magnetic layer 13 from external objects, and may be constituted of SiN, $SiO_2$, or diamond-like carbon. The exposed surface of the cover layer 15 constitutes a recording surface 16 of the magnetic disk X1.

The multilayer structure of the magnetic disk X1, which includes the disk substrate 11, the recording layer 12, the soft magnetic layer 13 and the cover layer 14, may further include an additional layer if necessary.

When recording information on the magnetic disk X1, a magnetic head (not shown) for recording is disposed so as to float above the recording surface 16 of the magnetic disk X1, and the magnetic head applies a recording magnetic field to the recording layer 16, to thereby form a plurality of recording marks (magnetic domains), alternately magnetized in opposite directions, serially aligned circumferentially of the disk along a recording magnetic region 12A of the recording layer 12. During this process, since the recording magnetic region 12A to which the magnetic field is sequentially applied for recording information is isolated from the adjacent recording magnetic region 12A by the non-magnetic region 12B, a cross-write effect, which erases or degrades the recording mark in the adjacent recording magnetic region 12A, can be prevented. The capability of preventing the cross-write effect is an advantageous feature of the magnetic disk in achieving a finer pitch of the tracks and higher recording density.

Figure 3:
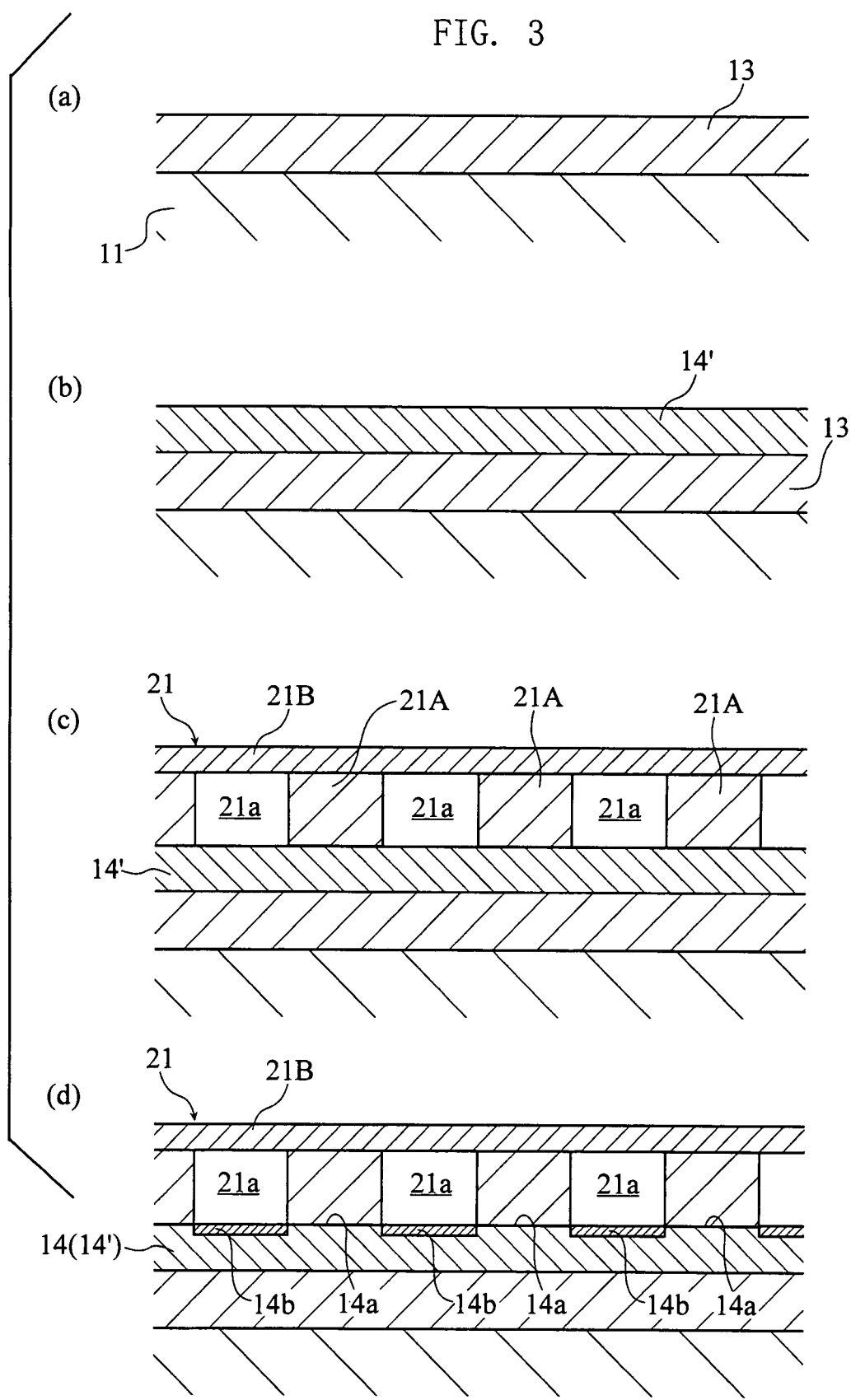
FIG. 3 is a cross-sectional view sequentially showing a manufacturing process of the magnetic disk of FIG. 1, according to a first method.

FIGS. 3(a) through 4(c) represent a first manufacturing method of the magnetic disk X1. Referring first to FIG. 3(a), the soft magnetic layer 13 is formed on the disk substrate 11. To form the soft magnetic layer 13, a sputtering process may be performed to deposit one of the foregoing soft magnetic materials, under a predetermined degree of vacuum.

Then as shown in FIG. 3(b), a seed layer 14' is formed on the soft magnetic layer 13. To form the seed layer 14', a sputtering process may be performed so as to deposit one of the materials cited with reference to the seed layer 14 on the soft magnetic layer 13, under a predetermined degree of vacuum. In this process, the seed layer 14' is formed so as to provide a crystal plane or crystal structure that orients the magnetic easy axis of the magnetic film constituted of the material for the recording layer 12 in a vertical direction, on the surface of the seed layer 14'.

Referring to FIG. 3(c), under a predetermined degree of vacuum, a mask 21 is brought into close contact with the seed layer 14'. The mask 21 includes a mask body 21A and a gas-permeable film 21B, and the mask body 21A is disposed in close contact with the seed layer 14' in this process. The mask body 21A includes an opening 21a of a shape corresponding to the pattern shape of the oxidized region 14b of the seed layer 14, and is constituted of a non-oxygen-permeable material. Suitable non-oxygen-permeable materials include $SiO_2$, SiC, Si, W, and diamond. Materials for the gas-permeable film include yttrium-stabilized zirconium monocrystal (hereinafter, YSZ) and polycarbonate.

Proceeding to FIG. 3(d), the seed layer 14' is exposed to oxygen, so as to oxidize the region not in close contact with the mask body 21A of the mask 21 on the surface of the seed layer 14', thus to form an oxidized region 14b (pattern oxidation step). In this process, oxygen is transmitted through the gas-permeable film 21B of the mask 21, and acts on the region on the surface of the seed layer 14' not in contact with the mask body 21A of the mask 21, thus to oxidize that region. The region on the surface of the seed layer 14' in close contact with the mask body 21A is not subjected to the oxidation and maintains the non-oxidized state. Through such process, the seed layer 14 including the non-oxidized region 14a of the predetermined pattern and the oxidized region 14b of the predetermined pattern can be obtained.

Then the oxygen used above is substantially removed from the chamber thus to set a predetermined degree of vacuum, and the mask 21 is removed as shown in FIG. 4(a). Referring then to FIG. 4(b), for example by a sputtering process under a predetermined degree of vacuum, one of the magnetic materials cited with reference to the recording layer 12 is deposited on the seed layer 14, thereby forming the recording layer 12. In this process, on the non-oxidized region 14a on the surface of the seed layer 14, the magnetic material epitaxially grows under a lattice matching with a crystal plane of the ground of the seed layer 14, and the magnetic easy axis of the magnetic film is controlled so as to be oriented in a vertical direction, so that the recording magnetic region 12A having the perpendicular magnetic anisotropy is obtained. At the same time, On the oxidized region 14b on the surface of the seed layer 14, the magnetic material inhibited from the lattice matching with the crystal plane of the ground of the seed layer 14 by the oxidized coating randomly grows (non-epitaxially grows), so that a non-recording magnetic region 12B in which a plurality of magnetic easy axes is randomly oriented is formed.

Referring finally to FIG. 4(c), the cover layer 15 is formed on the recording layer 12. To form the cover layer 15, a sputtering process may be performed under a predetermined degree of vacuum, so as to deposit one of the materials cited regarding the cover layer 15 on the recording layer 12. Upon completion of such steps, the magnetic disk X1 including the recording layer 12 having the recording magnetic region 12A of the predetermined pattern can be obtained.

By the method according to this embodiment, depositing the magnetic material on the seed layer 14 including on its surface the non-oxidized region 14a and the oxidized region 14b leads to formation of the recording layer 12 including the recording magnetic region 12A of the predetermined pattern, as described referring to FIG. 4(b). Also, such recording layer 12 can be formed as a continuous film structure, by a thin film formation technique such as a sputtering process. When forming the continuous film structure by a thin film formation technique, smaller surface unevenness i.e. higher surface flatness can be achieved than the non-continuous film structure as the recording layer 42 of the conventional magnetic disk 40. Accordingly, the method of this embodiment is appropriate for attaining sufficient flatness on the recording surface 16 that reflects the surface flatness of the recording layer 12. Thus, the method according to this embodiment is appropriate for fabricating a magnetic recording medium with a sufficiently flat recording surface 16, including a recording layer 12 having a recording magnetic region 12A of the predetermined pattern. The magnetic recording medium having the sufficiently flat recording surface is desirable in reducing the floating height of the magnetic head, and hence in increasing the recording density.

Further, the foregoing method is appropriate for an in-line arrangement. Through the formation step of the seed layer 14' described referring to FIG. 3(b), and the formation step of the recording layer 12 described referring to FIG. 4(b), the predetermined thin film formation process is performed in the predetermined chamber set at the predetermined degree of vacuum. Also, the series of steps between the formation step of the seed layer 14' and the formation step of the recording layer 12 as described referring to FIGS. 3(c) to 4(a) can be successively performed in the chamber following the formation step of the seed layer 14', and in the same chamber those series of steps can be followed by the formation step of the recording layer 12. Accordingly, the foregoing method eliminates the need to take out the disk under process from the chamber between the formation step of the seed layer 14' and the formation step of the recording layer 12, thereby facilitating arranging at least the series of steps from the formation step of the seed layer 14' to the formation step of the recording layer 12 in a single line. The method according to this embodiment is, therefore, appropriate for efficiently fabricating the magnetic disk X1 including the recording layer 12 having the recording magnetic region 12A of the predetermined pattern.

Thus, the method according to this embodiment is appropriate for fabricating with high efficiency the magnetic disk: X1 with the sufficiently flat recording surface 16, including the recording layer 12 having the recording magnetic region 12A of the predetermined pattern.

Figure 5:
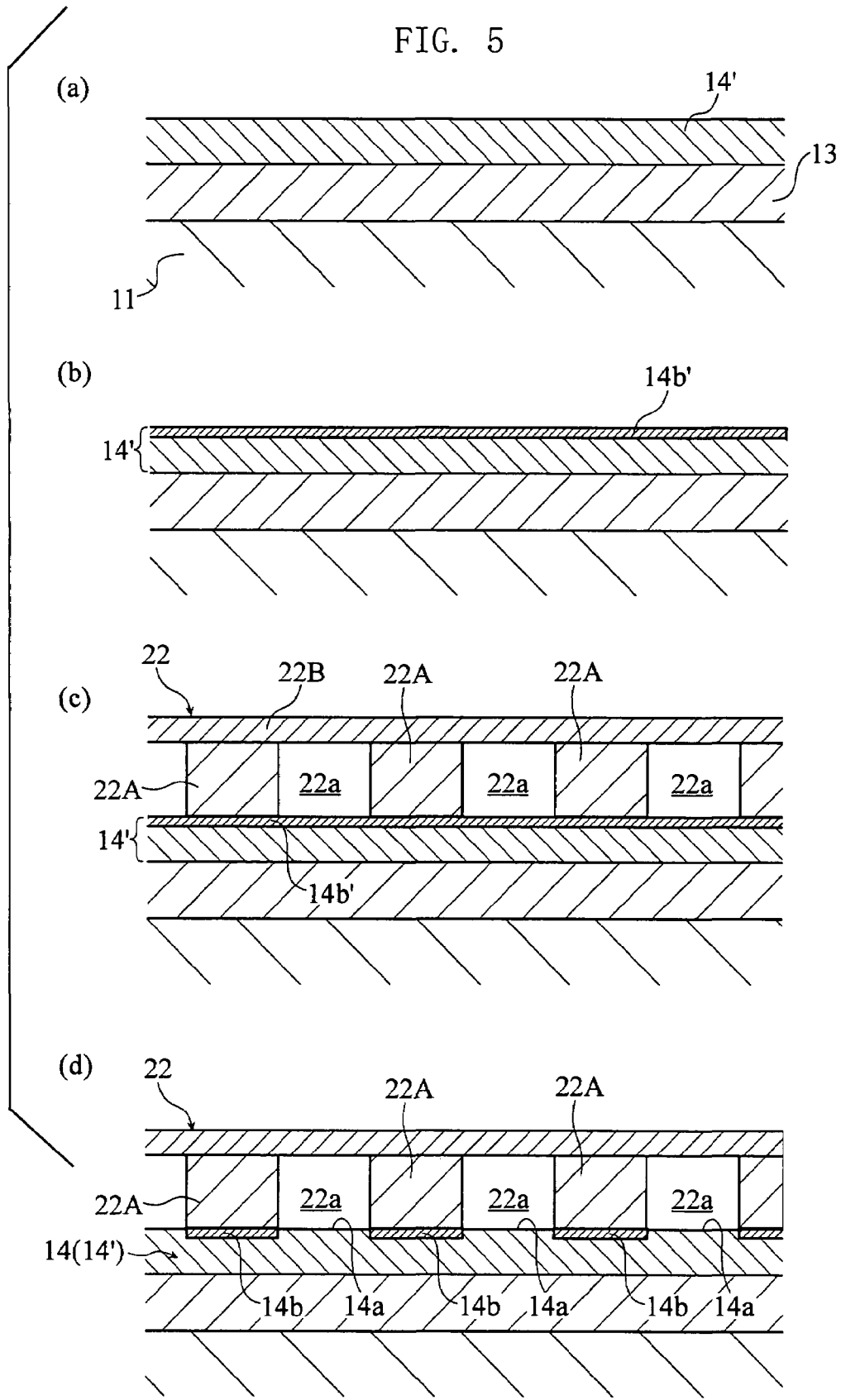
FIG. 5 is a cross-sectional view sequentially showing a manufacturing process of the magnetic disk of FIG. 1, according to a second method.

FIGS. 5(a) through 6(c) depict a second manufacturing method of the magnetic disk X1. In the second method, firstly the soft magnetic layer 13 and the seed layer 14' are sequentially formed on the disk substrate 11, as shown in FIG. 5(a). The formation method of the soft magnetic layer 13 and the seed layer 14', as well as the structure of the seed layer 14' are generally the same as those described regarding the first method.

Then the entire exposed surface of the seed layer 14' is exposed to oxygen, so as to form an oxidized coating 14b' as shown in FIG. 5(b).

Referring to FIG. 5(c), under a predetermined degree of vacuum, a mask 22 is brought into close contact with the oxidized coating 14b', hence to the seed layer 14'. The mask 22 includes a mask body 22A and a gas-permeable film 22B, and the mask body 22A is disposed in close contact with the oxidized coating 14b' or to the seed layer 14' in this process. The mask body 22A includes an opening 22a of a shape corresponding to the pattern shape of the non-oxidized region 14a of the seed layer 14, and is constituted of a non-hydrogen gas-permeable material. The gas-permeable film 22B is specifically a hydrogen gas-permeable material in this embodiment. Examples of the hydrogen gas-permeable material include a Pd—Ag alloy.

Proceeding to FIG. 5(d), by exposure to hydrogen (reduction gas) the surface of the seed layer 14' (oxidized coating 14b') not in close contact with the mask body 22A of the mask 22 is reduced, so that the non-oxidized region 14a is obtained. This process may be performed under a high temperature if necessary. The temperature may be set in a range of 200 to 500 degree centigrade. In this process, hydrogen is transmitted through the gas-permeable film 22B of the mask 22, and acts on the region on the seed layer 14' (oxidized coating 14b') not in contact with the mask body 22A of the mask 22, thus to reduce that region. The region on the surface of the seed layer 14' in close contact with the mask body 22A is not subjected to the reduction and maintains the oxidized state. Through such process, the seed layer 14 including the non-oxidized region 14a of the predetermined pattern and the oxidized region 14b of the predetermined pattern can be obtained.

Then the hydrogen used above is substantially removed from the chamber thus to set a predetermined degree of vacuum, and the mask 22 is removed as shown in FIG. 6(a). Referring then to FIG. 6(b), the recording layer 12 is formed for example by a sputtering process, under a predetermined degree of vacuum. The recording layer 12 may be formed through similar steps to those of the first method, as described referring to FIG. 4(b). Then the cover layer 15 is formed on the recording layer 12 as shown in FIG. 6(c). The cover layer 15 may also be formed similarly to the first method as described referring to FIG. 4(c). Upon completion of such steps, the magnetic disk X1 including the recording layer 12 having the recording magnetic region 12A of the predetermined pattern can be obtained.

By the second method, depositing the magnetic material on the seed layer 14 including on its surface the non-oxidized region 14a and the oxidized region 14b leads to formation of the recording layer 12 including the recording magnetic region 12A of the predetermined pattern, as described referring to FIG. 6(b). Also, such recording layer 12 can be formed as a continuous film structure, by a thin film formation technique such as a sputtering process. When forming the continuous film structure by a thin film formation technique, smaller surface unevenness i.e. higher surface flatness can be achieved than the non-continuous film structure as the recording layer 42 of the conventional magnetic disk 40. Accordingly, the method of this embodiment is appropriate for attaining sufficient flatness on the recording surface 16 that reflects the surface flatness of the recording layer 12. Thus, the method according to this embodiment is appropriate for fabricating a magnetic recording medium with a sufficiently flat recording surface 16, including a recording layer 12 having a recording magnetic region 12A of the predetermined pattern. The magnetic recording medium having the sufficiently flat recording surface is desirable in reducing the floating height of the magnetic head, and hence in increasing the recording density.

Further, the foregoing method is appropriate for an in-line arrangement. Through the formation step of the seed layer 14' described referring to FIG. 5(a), and the formation step of the recording layer 12 described referring to FIG. 6(b), the predetermined thin film formation process is performed in the predetermined chamber set at the predetermined degree of vacuum. Also, the series of steps between the formation step of the seed layer 14' and the formation step of the recording layer 12 as described referring to FIGS. 5(b) to 6(a) can be successively performed in the chamber following the formation step of the seed layer 14', and in the same chamber those series of steps can be followed by the formation step of the recording layer 12. Accordingly, the foregoing method eliminates the need to take out the disk under process from the chamber between the formation step of the seed layer 14' and the formation step of the recording layer 12, thereby facilitating arranging at least the series of steps from the formation step of the seed layer 14' to the formation step of the recording layer 12 in a single line. The method according to this embodiment is, therefore, appropriate for efficiently fabricating the magnetic disk X1 including the recording layer 12 having the recording magnetic region 12A of the predetermined pattern.

Thus, the foregoing second manufacturing method is appropriate for fabricating with high efficiency the magnetic disk X1 with the sufficiently flat recording surface 16, including the recording layer 12 having the recording magnetic region 12A of the predetermined pattern.

FIGS. 7(a) through 8(c) depict a third manufacturing method of the magnetic disk X1. In the second method, firstly the soft magnetic layer 13 and the seed layer 14' are sequentially formed on the disk substrate 11, as shown in FIG. 7(a). The formation method of the soft magnetic layer 13 and the seed layer 14', as well as the structure of the seed layer 14' are generally the same as those described regarding the first method.

Referring to FIG. 7(b), a base material 23 is pressed against the seed layer 14'. The base material 23 includes protrusions 23a, and may be constituted of Ni or a Ni-alloy. The protrusion 23a has a pattern shape corresponding to the oxidized region 14b of the seed layer 14. At least to a top portion of the protrusion 23a, an oxygen supplying substance 24 (solid) is adhered. The oxygen supplying substance 24 is constituted of a supersaturated metal oxide such as Y2O3 (yttrium oxide—yttria), TiO2 (titanium oxide), or PCMO (PrxCa1-xMnO3), and is deposited on the surface of the base material 23, for example by sputtering. In this process, the oxygen supplying substance 24 provided on the top portion of the protrusion 23a is positioned according to the pattern, when pressed against the seed layer 14'.

Then as shown in FIG. 7(c), a predetermined voltage is applied between the seed layer 14' and the base material 23, so as to oxidize a region on the surface of the seed layer 14' in contact with the oxygen supplying substance 24, thus to form the oxidized region 14b (pattern oxidation step). To be more detailed, in the oxygen supplying substance 24 interposed between the protrusion 23a of the base material 23 and the seed layer 14', oxygen ion ($O^{2-}$) is generated because of the electron supplied from the base material 23, and the oxygen ion migrates to the seed layer 14'. On the surface of the seed layer 14', the oxygen ion is caught in the region in contact with the oxygen supplying substance 24, so that the region is oxidized. On the surface of the seed layer 14', a region not in contact with the oxygen supplying substance 24 is not oxidized and hence maintains the non-oxidized state. Thus, the seed layer 14 including the non-oxidized region 14a of the predetermined pattern and the oxidized region 14b of the predetermined pattern can be obtained.

In the process related to FIG. 7(*b*), the oxygen supplying substance 24 may be constituted of a solid electrolyte or an oxidative solid, in place of the saturated metal oxide. Suitable solid electrolytes for the oxygen supplying substance 24 include YSZ and $ZrO_2$ (zirconium oxide). An example of the oxidative solid to constitute the oxygen supplying substance 24 is $NaClO_3$ (sodium chlorate). When employing the solid electrolyte to constitute the oxygen supplying substance 24, a voltage is applied between the seed layer 14' and the base material 23 to form the oxidized region 14b on the surface of the seed layer 14', under a high temperature if necessary. A suitable temperature range is 250 to 800 degree centigrade. On the surface of the seed layer 14', the oxygen ion is caught in the region in contact with the oxygen supplying substance 24, so that the region is oxidized. On the other hand, the oxidative solid is highly oxidative. Accordingly, simply bringing the oxidative solid into contact with the seed layer 14' achieves the oxidation of the region in contact with the oxidative solid. In this case, therefore, the application of the voltage and the heating are not necessary for the formation of the oxidized region 14b on the surface of the seed layer 14'.

The base material 23 is then removed as shown in FIG. 8(*a*), and a sputtering process may be performed under a predetermined degree of vacuum to form the recording layer 12, as shown in FIG. 8(*b*). The recording layer 12 may be formed through similar steps to those of the first method, as described referring to FIG. 4(*b*). Proceeding to FIG. 8(*c*), the cover layer 15 is formed on the recording layer 12. The cover layer 15 may be formed through similar steps to those of the first method, as described referring to FIG. 4(*c*). Upon completion of such steps, the magnetic disk X1 including the recording layer 12 having the recording magnetic region 12A of the predetermined pattern can be obtained.

By the second method, depositing the magnetic material on the seed layer 14 including on its surface the non-oxidized region 14a and the oxidized region 14b leads to formation of the recording layer 12 including the recording magnetic region 12A of the predetermined pattern, as described referring to FIG. 8(*b*). Also, such recording layer 12 can be formed as a continuous film structure, by a thin film formation technique such as a sputtering process. When forming the continuous film structure by a thin film formation technique, smaller surface unevenness i.e. higher surface flatness can be achieved than the non-continuous film structure as the recording layer 42 of the conventional magnetic disk 40. Accordingly, the method of this embodiment is appropriate for attaining sufficient flatness on the recording surface 16 that reflects the surface flatness of the recording layer 12. Thus, the method according to this embodiment is appropriate for fabricating a magnetic recording medium with a sufficiently flat recording surface 16, including a recording layer 12 having a recording magnetic region 12A of the predetermined pattern. The magnetic recording medium having the sufficiently flat recording surface is desirable in reducing the floating height of the magnetic head, and hence in increasing the recording density.

As another advantage, the base material 23, used for the formation of the seed layer 14 including the non-oxidized region 14a and the oxidized region 14b, is a metal material and hence sufficient rigid. Employing the base material 23 which is rigid leads to higher accuracy in dimensions of the non-oxidized region 14a and oxidized region 14b. According to the second method, therefore, the recording magnetic region 12A and the non-recording magnetic region 12B, formed on the non-oxidized region 14a and the oxidized region 14b respectively, can be formed with higher accuracy in dimensions.

Further, the foregoing second method is appropriate for an in-line arrangement. Through the formation step of the seed layer 14' described referring to FIG. 7(*a*), and the formation step of the recording layer 12 described referring to FIG. 8(*b*), the predetermined thin film formation process is performed in the predetermined chamber set at the predetermined degree of vacuum. Also, the series of steps between the formation step of the seed layer 14' and the formation step of the recording layer 12 as described referring to FIGS. 7(*b*) to 8(*a*) can be successively performed in the chamber following the formation step of the seed layer 14', and in the same chamber those series of steps can be followed by the formation step of the recording layer 12. Accordingly, the foregoing method eliminates the need to take out the disk under process from the chamber between the formation step of the seed layer 14' and the formation step of the recording layer 12, thereby facilitating arranging at least the series of steps from the formation step of the seed layer 14' to the formation step of the recording layer 12 in a single line. The method according to this embodiment is, therefore, appropriate for efficiently fabricating the magnetic disk X1 including the recording layer 12 having the recording magnetic region 12A of the predetermined pattern.

Thus, the foregoing second manufacturing method is appropriate for fabricating with high efficiency the magnetic disk X1 with the sufficiently flat recording surface 16, including the recording layer 12 having the recording magnetic region 12A of the predetermined pattern.

Figure 9:
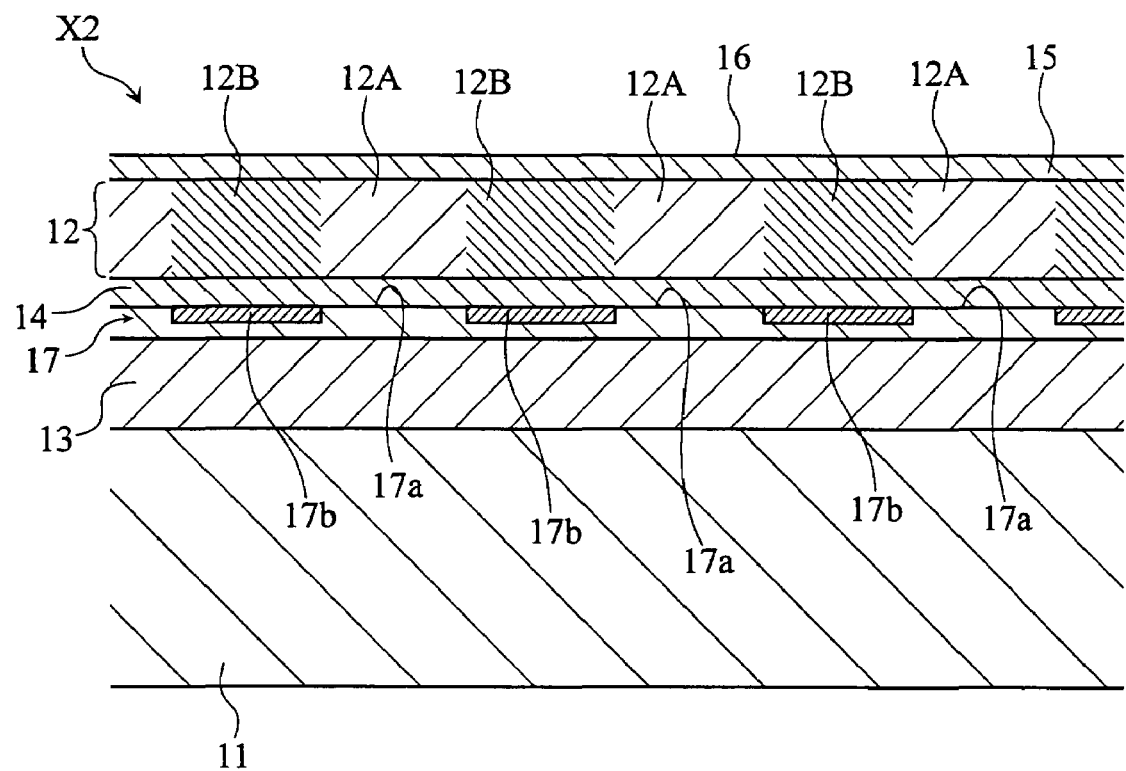
FIG. 9 is a fragmentary cross-sectional view of a magnetic disk according to a second embodiment of the present invention.
Figure 11:
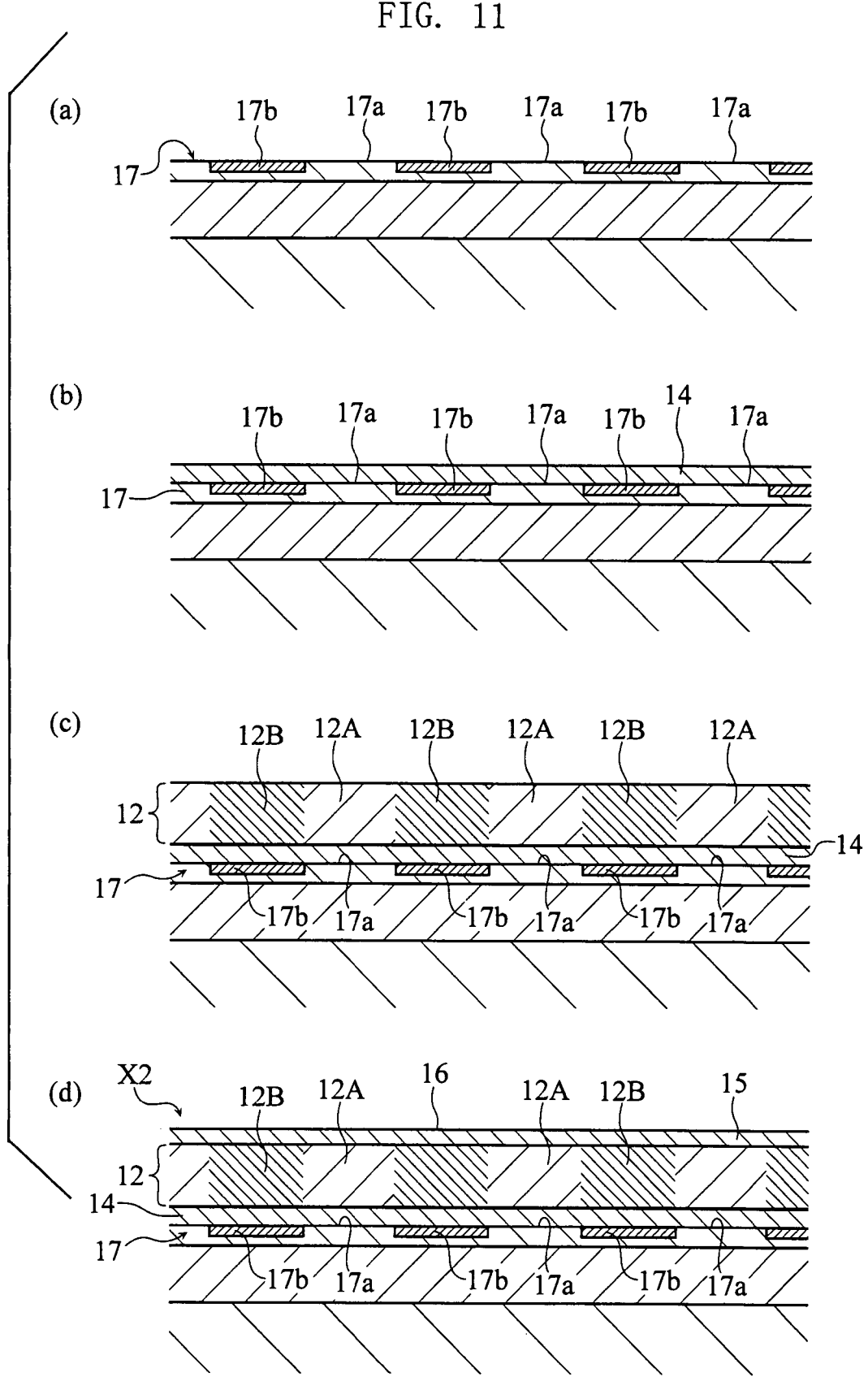
FIG. 11 is a cross-sectional view showing the steps following FIG. 10.

FIG. 9 is a fragmentary cross-sectional view taken radially of a magnetic disk X2 according to a second embodiment of the present invention. The magnetic disk X2 has a multilayer structure including the disk substrate 11, the recording layer 12, the soft magnetic layer 13, a pre-seed layer 17, the seed layer 14, and the cover layer 15 (not shown), configured as a discrete track medium. The magnetic disk X2 is different from the magnetic disk X1 in that the pre-seed layer 17 is additionally provided between the soft magnetic layer 13 and the seed layer 14.

The pre-seed layer 17 includes a non-oxidized region 17a and an oxidized region 17b on the surface thereof opposing the seed layer 14, and serves to orient the azimuth of a crystal plane of a region of the seed layer 14 corresponding to the non-oxidized region 17a in a predetermined direction. The pre-seed layer 17 is disposed between the soft magnetic layer 13 and the seed layer 14 so as to serve to inhibit the crystal structure of the soft magnetic layer 13 from unduly interfering in the orientation of the crystal structure and the magnetic easy axis of the seed layer 14. The pre-seed layer 17 thus provided is, preferably, constituted of a non-crystalline material. Suitable materials to constitute the pre-seed layer 17 include a single metal selected from the group consisting of Ta, Pt, Ni, Fe, Ti, W, Mo, B, C, Si, and Ge, and a compound containing a chemical species thereof. The non-oxidized region 17a has a pattern shape corresponding to the recording magnetic region 12A in the recording layer 12, and the oxidized region 17b has a pattern shape corresponding to the non-recording magnetic region 12B. In other words, the recording magnetic region 12A in the recording layer 12 is located on the non-oxidized region 17a, and the non-recording magnetic region 12B is located on the oxidized region 17b. The pre-seed layer 17 may have a thickness of 0.5 to 50 nm. Employing the pre-seed layer 17 thus configured allows reducing the thickness of the seed layer 14, and is hence advantageous in making the magnetic disk X2 thinner.

FIGS. 10(a) through 11(d) represent a first manufacturing method of the magnetic disk X2. Referring first to FIG. 10(a), the soft magnetic layer 13 is formed on the disk substrate 11. To form the soft magnetic layer 13, a sputtering process may be performed to deposit one of the foregoing materials cited regarding the soft magnetic layer 13, under a predetermined degree of vacuum.

Then as shown in FIG. 10(b), a pre-seed layer 17' is formed on the soft magnetic layer 13. To form the pre-seed layer 17', a sputtering process may be performed so as to deposit one of the materials cited with reference to the pre-seed layer 17 on the soft magnetic layer 13, under a predetermined degree of vacuum. In this process, the pre-seed layer 17' is formed so as to provide a crystal plane or crystal structure that orients the magnetic easy axis of the magnetic film constituted of the material for the recording layer 12 in a vertical direction, on the surface of the pre-seed layer 17'.

Referring to FIG. 10(c), under a predetermined degree of vacuum, the mask 21 is brought into close contact with the pre-seed layer 17'. The mask 21 may be similarly constituted to that employed in the first method of manufacturing the magnetic disk X1, as described referring to FIG. 3(c).

Proceeding to FIG. 10(d), the pre-seed layer 17' is exposed to oxygen, so as to oxidize the region not in close contact with the mask body 21A of the mask 21 on the surface of the pre-seed layer 17', thus to form an oxidized region 17b (pattern oxidation step). In this process, oxygen is transmitted through the gas-permeable film 21B of the mask 21, and acts on the region on the surface of the pre-seed layer 17' not in contact with the mask body 21A of the mask 21, thus to oxidize that region. The region on the surface of the pre-seed layer 17' in close contact with the mask body 21A is not subjected to the oxidation and maintains the non-oxidized state. Through such process, the pre-seed layer 17 including the non-oxidized region 17a of the predetermined pattern and the oxidized region 17b of the predetermined pattern can be obtained.

Then the oxygen used above is substantially removed from the chamber thus to set a predetermined degree of vacuum, and the mask 21 is removed as shown in FIG. 11(a). Referring then to FIG. 11(b), the seed layer 14 is formed on the pre-seed layer 17. To form the seed layer 14, a sputtering process may be performed to deposit one of the magnetic materials cited with reference to the seed layer 14 under a predetermined degree of vacuum, on the pre-seed layer 17. In this process, the seed layer 14 reflects the pattern of the non-oxidized region 17a and the oxidized region 17b on the surface of the pre-seed layer 17, thereby obtains the predetermined pattern in the aspect of the azimuth of the crystal plane. To be more detailed, based on the fact that on the non-oxidized region on the surface of the pre-seed layer 17 the material of the seed layer tends to grow with the crystal plane well aligned while on the oxidized region on the surface of the pre-seed layer 17 the material of the seed layer barely achieves the alignment of the crystal plane, in this process the surface of the seed layer 14 is provided with a first region (which reflects the non-oxidized region 17a on the surface of the pre-seed layer 17) having the crystal plane or crystal structure that orients the magnetic easy axis of the magnetic film constituted of the magnetic material for the recording layer 12 in a vertical direction, and a second region (which reflects the oxidized region 17b on the surface of the pre-seed layer 17) where the magnetic easy axis of the magnetic film constituted of the magnetic material for the recording layer 12 cannot be vertically oriented.

Proceeding to FIG. 11(c), the recording layer 12 is formed for example by a sputtering process, under a predetermined degree of vacuum. In this process, on the first region on the surface of the seed layer 14 (corresponding to the non-oxidized region 17a on the surface of the pre-seed layer 17), the magnetic material epitaxially grows under a lattice matching with a crystal plane of the ground of the seed layer 14, and the magnetic easy axis of the magnetic film is controlled so as to be oriented in a vertical direction, so that the recording magnetic region 12A having the perpendicular magnetic anisotropy is obtained. At the same time, on the second region 14b on the surface of the seed layer 14 (corresponding to the oxidized region 17b on the surface of the pre-seed layer 17), the magnetic material randomly grows (non-epitaxially grows), so that a non-recording magnetic region 12B in which a plurality of magnetic easy axes is randomly oriented is formed.

Referring finally to FIG. 11(d), the cover layer 15 is formed on the recording layer 12. The cover layer 15 may be formed through similar steps to those of the first method, as described referring to FIG. 4(c). Upon completion of such steps, the magnetic disk X2 including the recording layer 12 having the recording magnetic region 12A of the predetermined pattern can be obtained.

By the foregoing method, depositing the magnetic material on the seed layer 14 including on its surface the first region (which reflects the non-oxidized region 17a on the surface of the pre-seed layer 17) and the second region (which reflects the oxidized region 17b on the surface of the pre-seed layer 17) leads to formation of the recording layer 12 including the recording magnetic region 12A of the predetermined pattern, as described referring to FIG. 11(c). Also, such recording layer 12 can be formed as a continuous film structure, by a thin film formation technique such as a sputtering process. When forming the continuous film structure by a thin film formation technique, smaller surface unevenness i.e. higher surface flatness can be achieved than the non-continuous film structure as the recording layer 42 of the conventional magnetic disk 40. Accordingly, the method of this embodiment is appropriate for attaining sufficient flatness on the recording surface 16 that reflects the surface flatness of the recording layer 12. Thus, the method according to this embodiment is appropriate for fabricating a magnetic recording medium with a sufficiently flat recording surface 16, including a recording layer 12 having a recording magnetic region 12A of the predetermined pattern. The magnetic recording medium having the sufficiently flat recording surface is desirable in reducing the floating height of the magnetic head, and hence in increasing the recording density.

Further, the foregoing second method is appropriate for an in-line arrangement. Through the formation step of the pre-seed layer 17' described referring to FIG. 10(b), the formation step of the seed layer 14 described referring to FIG. 11(b), and the formation step of the recording layer 12 described referring to FIG. 11(c), the predetermined thin film formation process is performed in the predetermined chamber set at the predetermined degree of vacuum. Also, the series of steps between the formation step of the pre-seed layer 17' and the formation step of the seed layer 14 as described referring to FIGS. 10(c) to 11(a) can be successively performed in the chamber following the formation step of the pre-seed layer 17', and in the same chamber those series of steps can be followed by the formation step of the seed layer 14. Accordingly, the foregoing method eliminates the need to take out the disk under process from the chamber between the formation step of the pre-seed layer 17' and the formation step of the recording layer 12, thereby facilitating arranging at least the series of steps from the formation step of the pre-seed layer 17' to the formation step of the recording layer 12 in a single line. The foregoing method is, therefore, appropriate for efficiently fabricating the magnetic disk X2 including the recording layer 12 having the recording magnetic region 12A of the predetermined pattern.

Thus, the foregoing manufacturing method is appropriate for fabricating with high efficiency the magnetic disk X2 with the sufficiently flat recording surface 16, including the recording layer 12 having the recording magnetic region 12A of the predetermined pattern.

Figure 12:
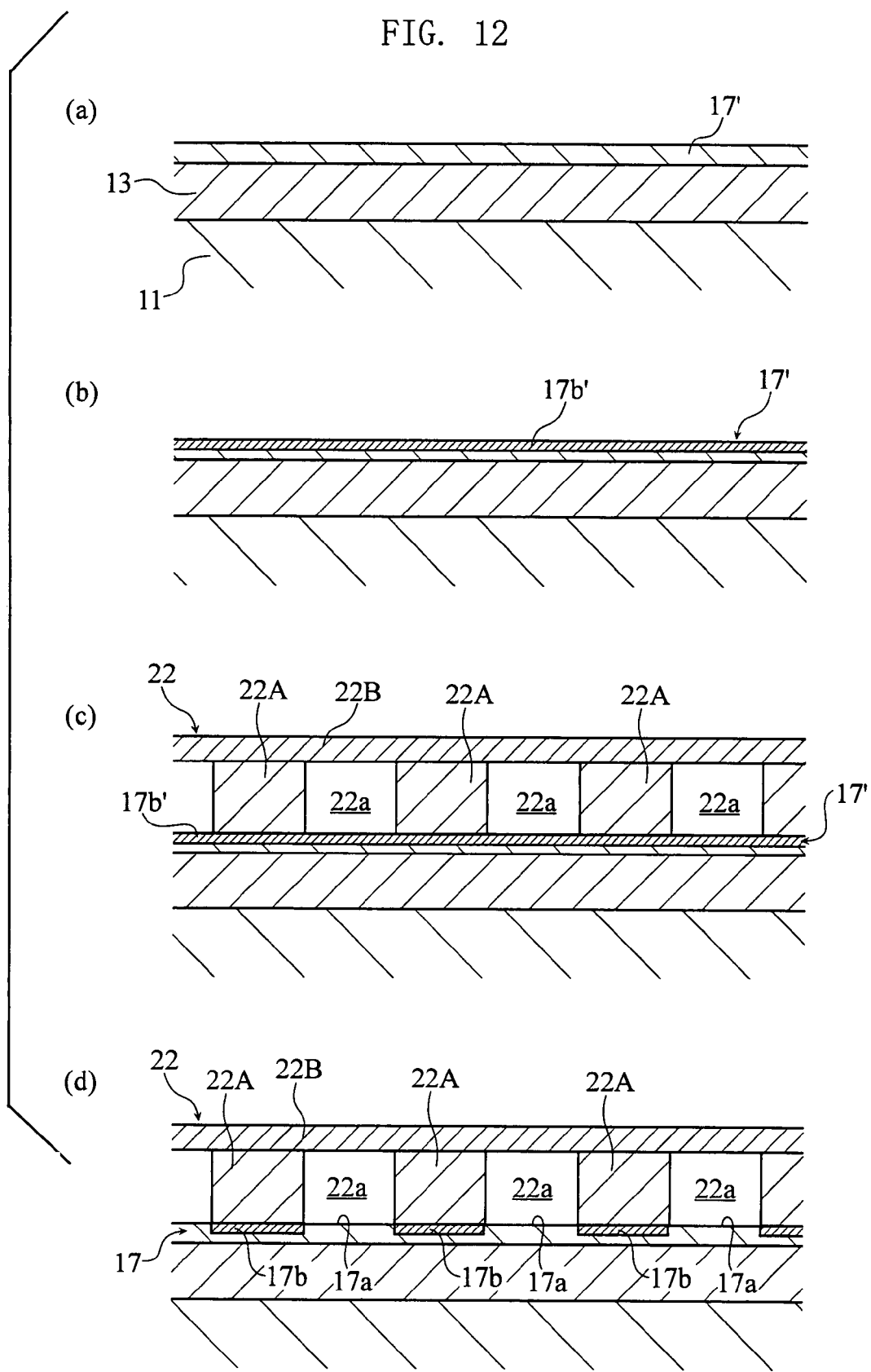
FIG. 12 is a cross-sectional view sequentially showing a manufacturing process of the magnetic disk of FIG. 9, according to a second method.
Figure 13:
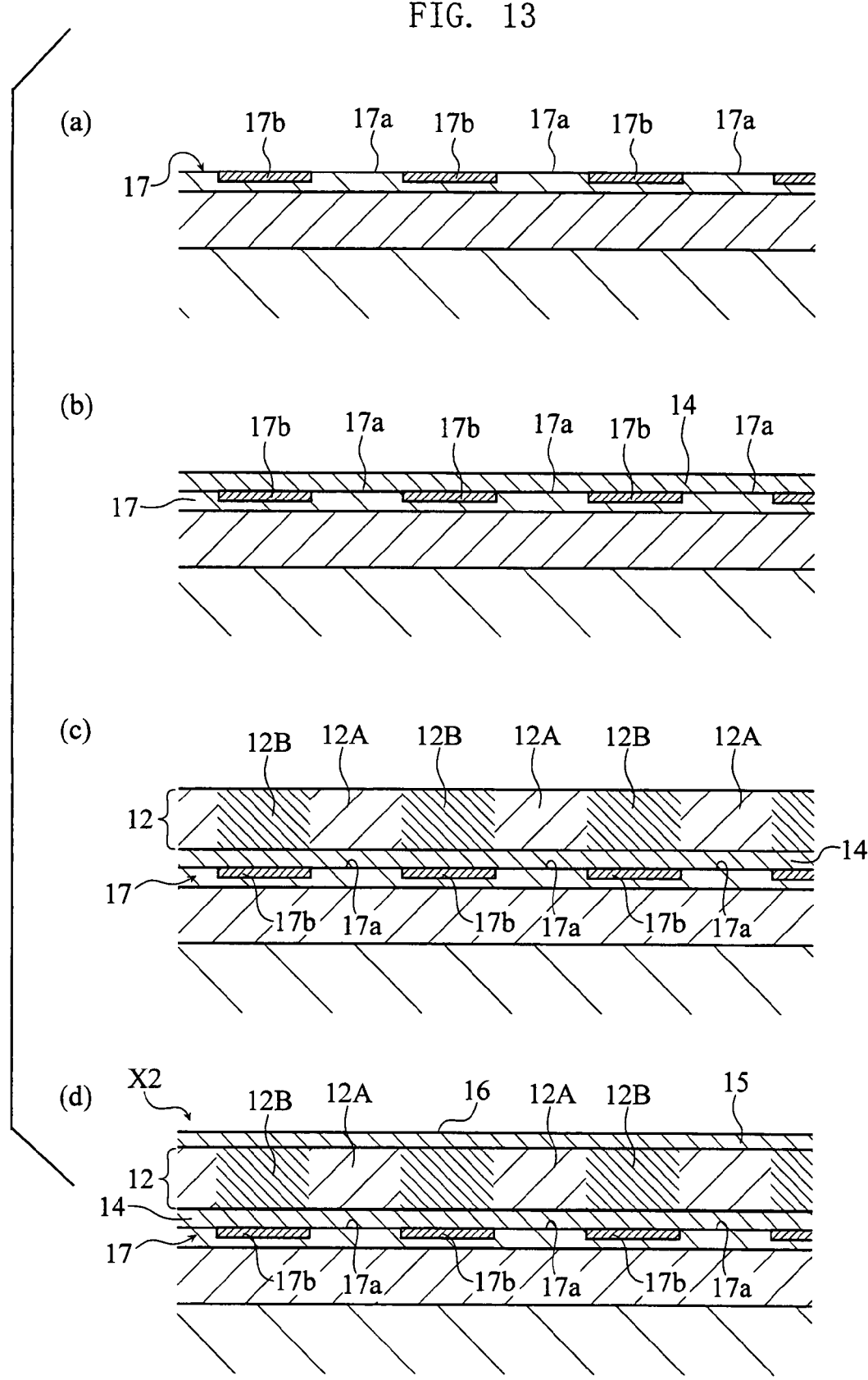
FIG. 13 is a cross-sectional view showing the steps following FIG. 12.

FIGS. 12A through 13(*d*) depict a second manufacturing method of the magnetic disk X2. In the second method, firstly the soft magnetic layer 13 and the pre-seed layer 17' are sequentially formed on the disk substrate 11, as shown in FIG. 12(*a*). The formation method of the soft magnetic layer 13 and the pre-seed layer 17', as well as the structure of the pre-seed layer 17' are generally the same as those described regarding the first manufacturing method of the magnetic disk X2.

Then the entire exposed surface of the pre-seed layer 17' is exposed to oxygen, so as to form an oxidized coating 17b' as shown in FIG. 12(*b*).

Then the oxygen used above is substantially removed from the chamber thus to set a predetermined degree of vacuum, and the mask 22 is brought into close contact with the oxidized coating 17b', hence to the pre-seed layer 17', as shown in FIG. 12(*c*). The structure of the mask 22 is similar to that employed in the second manufacturing method of the magnetic disk X1, as described referring to FIG. 5(*c*).

Proceeding to FIG. 12(*d*), by exposure to hydrogen (reduction gas) the surface of the pre-seed layer 17' (oxidized coating 17b') not in close contact with the mask body 22A of the mask 22 is reduced, so that the non-oxidized region 17a is obtained. This process may be performed under a high temperature if necessary. The temperature may be set in a range of 200 to 500 degree centigrade. In this process, hydrogen is transmitted through the gas-permeable film 22B of the mask 22, and acts on the region on the pre-seed layer 17' (oxidized coating 17b') not in contact with the mask body 22A of the mask 22, thus to reduce that region. The region on the surface of the pre-seed layer 17' in close contact with the mask body 22A is not subjected to the reduction and maintains the oxidized state. Through such process, the seed layer 17 including the non-oxidized region 17a of the predetermined pattern and the oxidized region 17b of the predetermined pattern can be obtained.

Then the hydrogen used above is substantially removed from the chamber thus to set a predetermined degree of vacuum, and the mask 22 is removed as shown in FIG. 13(*a*). Referring then to FIG. 13(*b*), the seed layer 14 is formed on the pre-seed layer 17. The seed layer 14 may be formed through similar steps to those of the first manufacturing method of the magnetic disk X2, as described referring to FIG. 11(*b*). Referring then to FIG. 13(*c*), the recording layer 12 is formed by a sputtering process under a predetermined degree of vacuum for example. The recording layer 12 may be formed through similar steps to those of the first manufacturing method of the magnetic disk X2, as described referring to FIG. 11(*c*). This is followed by formation of the cover layer on the recording layer 12, as shown in FIG. 13(*d*). The cover layer 15 may be formed through similar steps to those of the first manufacturing method of the magnetic disk X1, as described referring to FIG. 4(*c*). Upon completion of such steps, the magnetic disk X2 including the recording layer 12 having the recording magnetic region 12A of the predetermined pattern can be obtained.

By the foregoing method, depositing the magnetic material on the seed layer 14 including on its surface the first region (which reflects the non-oxidized region 17a on the surface of the pre-seed layer 17) and the second region (which reflects the oxidized region 17b on the surface of the pre-seed layer 17) leads to formation of the recording layer 12 including the recording magnetic region 12A of the predetermined pattern, as described referring to FIG. 13(*c*). Also, such recording layer 12 can be formed as a continuous film structure, by a thin film formation technique such as a sputtering process. When forming the continuous film structure by a thin film formation technique, smaller surface unevenness i.e. higher surface flatness can be achieved than the non-continuous film structure as the recording layer 42 of the conventional magnetic disk 40. Accordingly, the method of this embodiment is appropriate for attaining sufficient flatness on the recording surface 16 that reflects the surface flatness of the recording layer 12. Thus, the method according to this embodiment is appropriate for fabricating a magnetic recording medium with a sufficiently flat recording surface 16, including a recording layer 12 having a recording magnetic region 12A of the predetermined pattern. The magnetic recording medium having the sufficiently flat recording surface is desirable in reducing the floating height of the magnetic head, and hence in increasing the recording density.

Further, the foregoing second method is appropriate for an in-line arrangement. Through the formation step of the pre-seed layer 17' described referring to FIG. 12(*a*), the formation step of the seed layer 14 described referring to FIG. 13(*b*), and the formation step of the recording layer 12 described referring to FIG. 13(*c*), the predetermined thin film formation process is performed in the predetermined chamber set at the predetermined degree of vacuum. Also, the series of steps between the formation step of the pre-seed layer 17' and the formation step of the seed layer 14 as described referring to FIGS. 12B to 13(*a*) can be successively performed in the chamber following the formation step of the pre-seed layer 17', and in the same chamber those series of steps can be followed by the formation step of the seed layer 14. Accordingly, the foregoing method eliminates the need to take out the disk under process from the chamber between the formation step of the pre-seed layer 17' and the formation step of the recording layer 12, thereby facilitating arranging at least the series of steps from the formation step of the pre-seed layer 17' to the formation step of the recording layer 12 in a single line. The foregoing method is, therefore, appropriate for efficiently fabricating the magnetic disk X2 including the recording layer 12 having the recording magnetic region 12A of the predetermined pattern.

Thus, the foregoing manufacturing method is appropriate for fabricating with high efficiency the magnetic disk X2 with the sufficiently flat recording surface 16, including the recording layer 12 having the recording magnetic region 12A of the predetermined pattern.

FIGS. 14(*a*) through 15(*d*) depict a third manufacturing method of the magnetic disk X2. In the third method, firstly the soft magnetic layer 13 and the pre-seed layer 17' are sequentially formed on the disk substrate 11, as shown in FIG. 14(*a*). The formation method of the soft magnetic layer 13 and the pre-seed layer 17', as well as the structure of the pre-seed layer 17' are generally the same as those described regarding the first manufacturing method of the magnetic disk X2.

Referring to FIG. 14(b), the base material 23 provided with the oxygen supplying substance 24 on its surface is pressed against the pre-seed layer 17'. The base material 23 and the oxygen supplying substance 24 are of a similar structure to those employed in the third manufacturing method of the magnetic disk X1 as described referring to FIG. 7(b). In this process, the oxygen supplying substance 24 provided on the top portion of the protrusion 23a is positioned according to the pattern, when pressed against the pre-seed layer 17'.

Then as shown in FIG. 14(c), a predetermined voltage is applied between the pre-seed layer 17' and the base material 23, so as to oxidize a region on the surface of the pre-seed layer 17' in contact with the oxygen supplying substance 24, thus to form the oxidized region 17b (pattern oxidation step). To be more detailed, in the oxygen supplying substance 24 interposed between the protrusion 23a of the base material 23 and the pre-seed layer 17', oxygen ion ($O^{2-}$) is generated because of the electron supplied from the base material 23, and the oxygen ion migrates to the pre-seed layer 17'. On the surface of the pre-seed layer 17', the oxygen ion is caught in the region in contact with the oxygen supplying substance 24, so that the region is oxidized. On the surface of the pre-seed layer 17', a region not in contact with the oxygen supplying substance 24 is not oxidized and hence maintains the non-oxidized state. Thus, the seed layer 17 including the non-oxidized region 17a of the predetermined pattern and the oxidized region 17b of the predetermined pattern can be obtained.

In the process related to FIG. 14(b), the oxygen supplying substance 24 may be constituted of a solid electrolyte or an oxidative solid, in place of the saturated metal oxide. Those solid electrolytes and oxidative solids referred to in the description of the third manufacturing method of the magnetic disk X1 may be employed. When employing the solid electrolyte to constitute the oxygen supplying substance 24, a voltage is applied between the seed layer 14' and the base material 23 to form the oxidized region 14b on the surface of the seed layer 14', under a high temperature if necessary. A suitable temperature range is 250 to 800 degree centigrade. On the surface of the seed layer 14', the oxygen ion is caught in the region in contact with the oxygen supplying substance 24, so that the region is oxidized. On the other hand, the oxidative solid is highly oxidative. Accordingly, simply bringing the oxidative solid into contact with the seed layer 14' achieves the oxidation of the region in contact with the oxidative solid. In this case, therefore, the application of the voltage and the heating are not necessary for the formation of the oxidized region 14b on the surface of the seed layer 14'.

Figure 15:
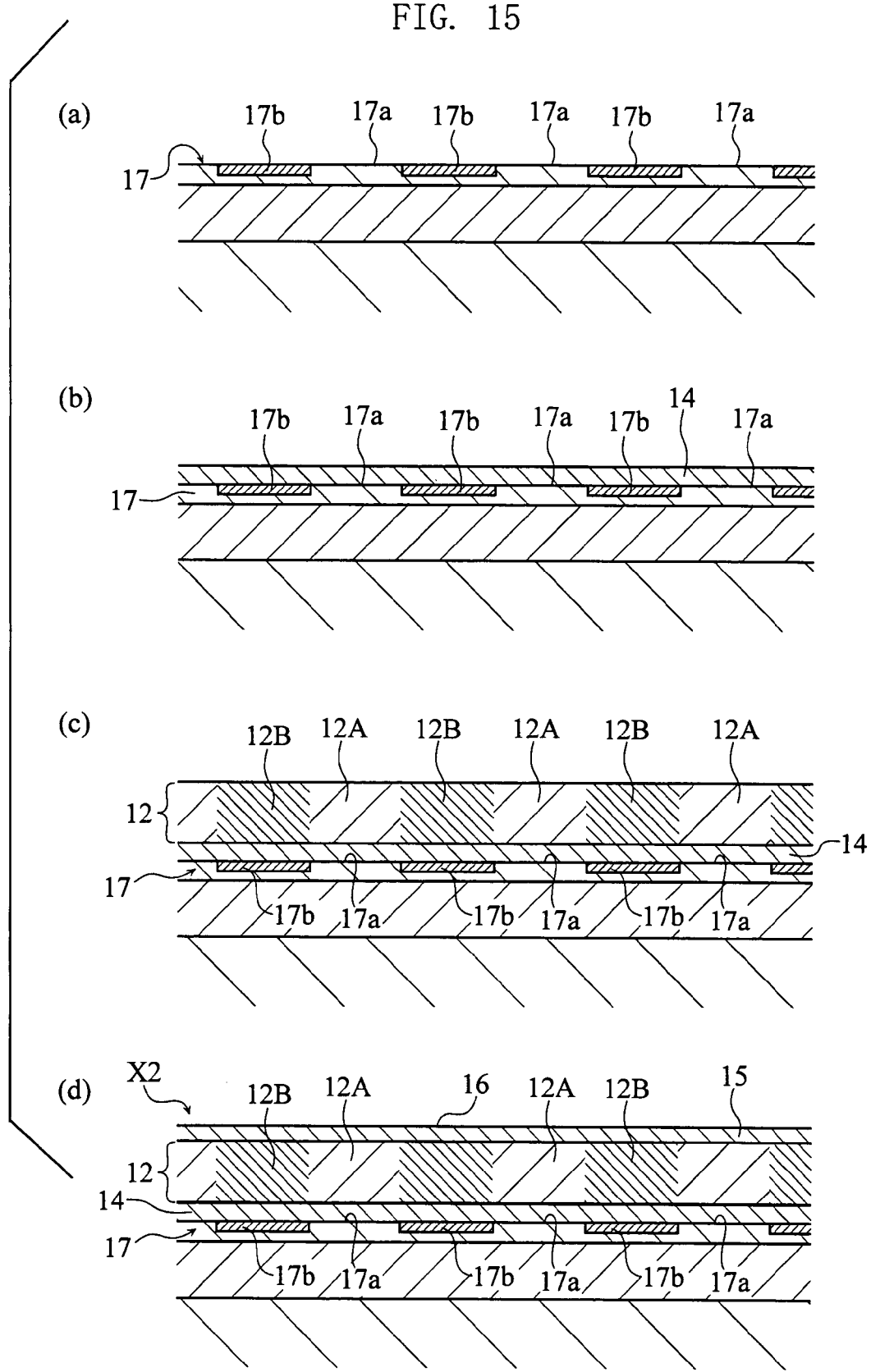
FIG. 15 is a cross-sectional view showing the steps following FIG. 14.

The base material 23 is then removed as shown in FIG. 15(a), and the seed layer 14 is formed on the pre-seed layer 17, as shown in FIG. 15(b). The seed layer 14 may be formed through similar steps to those of the first manufacturing method of the magnetic disk X2, as described referring to FIG. 11(b). Proceeding to FIG. 15(c), the cover layer 15 is formed on the recording layer 12 for example by a sputtering process under a predetermined degree of vacuum. The cover layer 15 may be formed through similar steps to those of the first manufacturing method of the magnetic disk X1, as described referring to FIG. 4(c). Upon completion of such steps, the magnetic disk X2 including the recording layer 12 having the recording magnetic region 12A of the predetermined pattern can be obtained.

By the foregoing method, depositing the magnetic material on the seed layer 14 including on its surface the first region (which reflects the non-oxidized region 17a on the surface of the pre-seed layer 17) and the second region (which reflects the oxidized region 17b on the surface of the pre-seed layer 17) leads to formation of the recording layer 12 including the recording magnetic region 12A of the predetermined pattern, as described referring to FIG. 15(c). Also, such recording layer 12 can be formed as a continuous film structure, by a thin film formation technique such as a sputtering process. When forming the continuous film structure by a thin film formation technique, smaller surface unevenness i.e. higher surface flatness can be achieved than the non-continuous film structure as the recording layer 42 of the conventional magnetic disk 40. Accordingly, the method of this embodiment is appropriate for attaining sufficient flatness on the recording surface 16 that reflects the surface flatness of the recording layer 12. Thus, the method according to this embodiment is appropriate for fabricating a magnetic recording medium with a sufficiently flat recording surface 16, including a recording layer 12 having a recording magnetic region 12A of the predetermined pattern. The magnetic recording medium having the sufficiently flat recording surface is desirable in reducing the floating height of the magnetic head, and hence in increasing the recording density.

Further, the base material 23, used for the formation of the seed layer 14 including the non-oxidized region 14a and the oxidized region 14b, is a metal material and hence sufficient rigid. Employing the base material 23 which is rigid leads to higher accuracy in dimensions of the non-oxidized region 14a and oxidized region 14b. According to the second method, therefore, the recording magnetic region 12A and the non-recording magnetic region 12B, formed on the non-oxidized region 14a and the oxidized region 14b respectively, can be formed with higher accuracy in dimensions.

Further, the foregoing second method is appropriate for an in-line arrangement. Through the formation step of the pre-seed layer 17' described referring to FIG. 14(a), the formation step of the seed layer 14 described referring to FIG. 15(b), and the formation step of the recording layer 12 described referring to FIG. 15(c), the predetermined thin film formation process is performed in the predetermined chamber set at the predetermined degree of vacuum. Also, the series of steps between the formation step of the pre-seed layer 17' and the formation step of the seed layer 14 as described referring to FIGS. 14(b) to 15(a) can be successively performed in the chamber following the formation step of the pre-seed layer 17', and in the same chamber those series of steps can be followed by the formation step of the seed layer 14. Accordingly, the foregoing method eliminates the need to take out the disk under process from the chamber between the formation step of the pre-seed layer 17' and the formation step of the recording layer 12, thereby facilitating arranging at least the series of steps from the formation step of the pre-seed layer 17' to the formation step of the recording layer 12 in a single line. The foregoing method is, therefore, appropriate for efficiently fabricating the magnetic disk X2 including the recording layer 12 having the recording magnetic region 12A of the predetermined pattern.

Thus, the foregoing manufacturing method is appropriate for fabricating with high efficiency the magnetic disk X2 with the sufficiently flat recording surface 16, including the recording layer 12 having the recording magnetic region 12A of the predetermined pattern.

Working Example 1

Preparation of Layered Structure Sample

Figure 16:
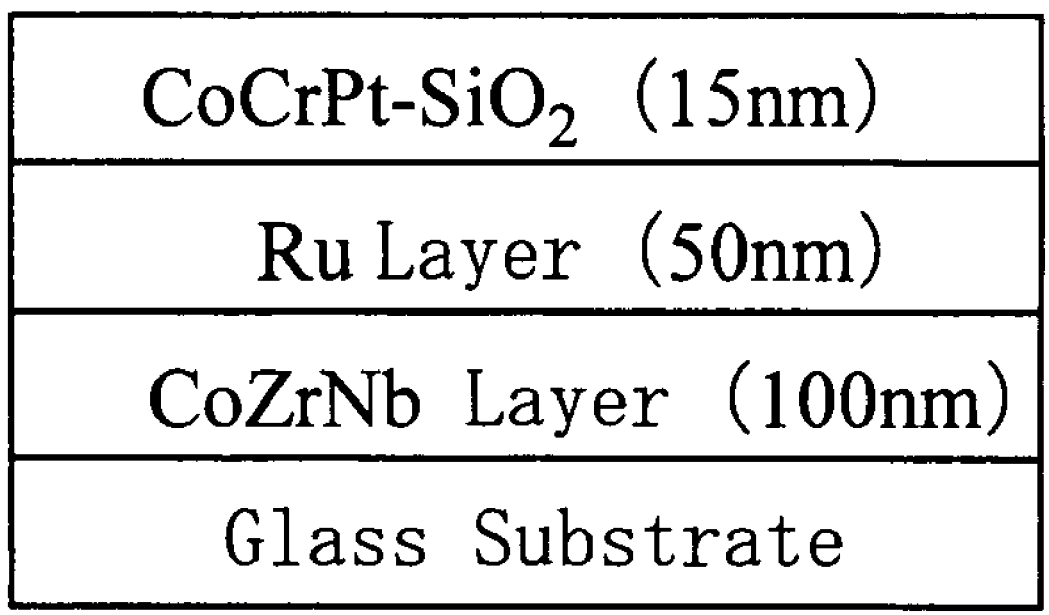
FIG. 16 is a diagram showing a multilayer structure of a layered structure sample.

A layered structure as that shown in FIG. 16 was prepared as a layered structure sample for the working example 1. To make up the layered structure sample, firstly a sputtering process was performed to deposit CoZrNb of a predetermined composition ratio on a glass substrate, thus forming a CoZrNb layer in a thickness of 100 nm. The CoZrNb is popularly employed to constitute the soft magnetic layer of the magnetic disk. The sputtering process was performed in a predetermined chamber, utilizing a predetermined sputtering apparatus. This also applies to the subsequent sputtering processes. The gas pressure in the chamber was set at 0.8 Pa.

Then Ru was deposited by sputtering, thus to form a Ru layer of 50 nm in thickness, on the CoZrNb layer. The Ru is popularly employed to constitute the seed layer of the magnetic disk. For this sputtering process, the gas pressure in the chamber was set at 0.6 Pa.

Again the sputtering process was performed to deposit $Co_{77}Cr_{20}Pt_3$—$SiO_2$, thus to form a $Co_{77}Cr_{20}Pt_3$—$SiO_2$ layer of 15 nm in thickness, on the Ru layer. The CoCrPt—$SiO_2$ is popularly employed to constitute the recording layer of the magnetic disk. The layered structure sample for this working example was thus prepared.

<Coercivity Measurement>

Figure 17:
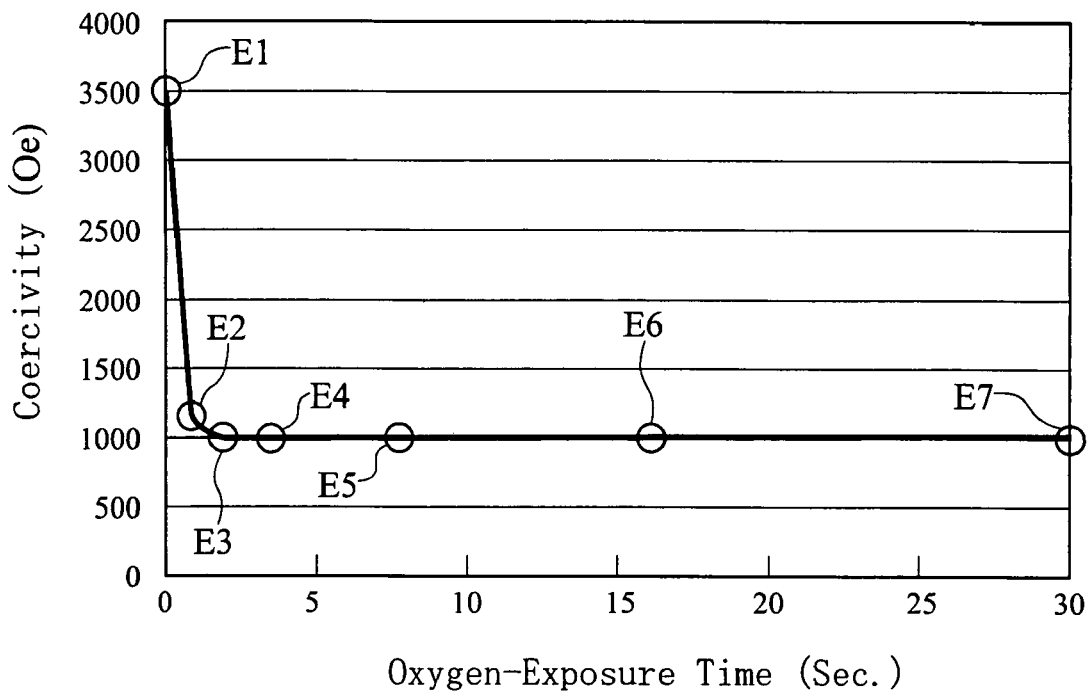
FIG. 17 is a graph showing a measurement result of vertical coercivity of the magnetic film with respect to the layered structure samples according to working examples 1 to 7.
Figure 18:
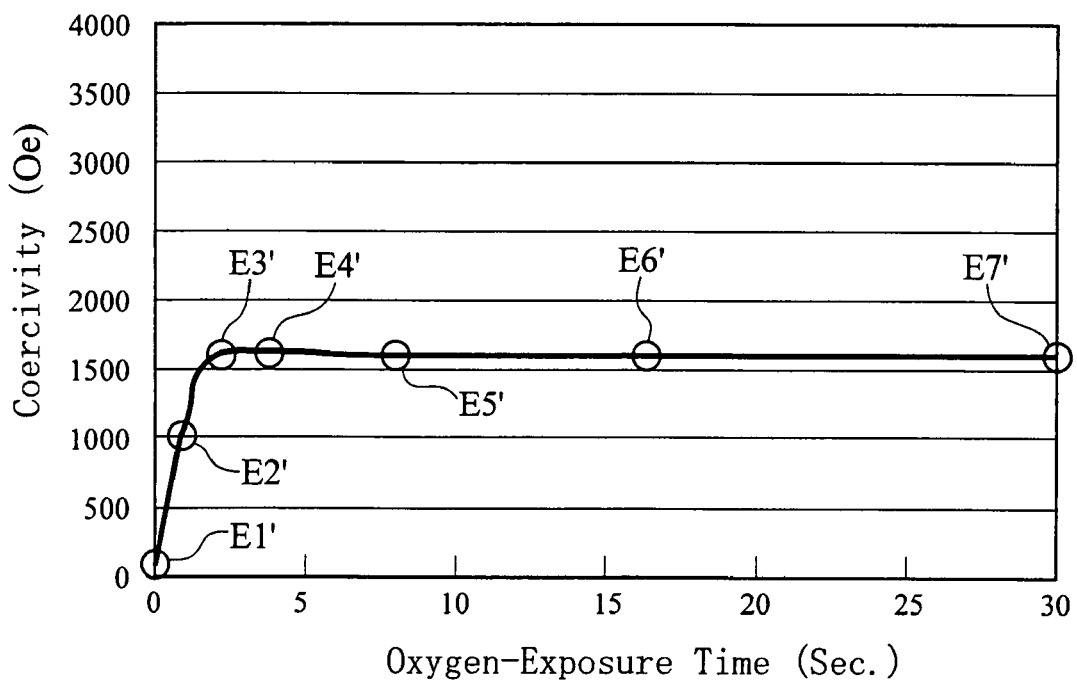
FIG. 18 is a graph showing a measurement result of in-plane coercivity of the magnetic film with respect to the layered structure samples according to the working examples 1 to 7.
Figure 21:
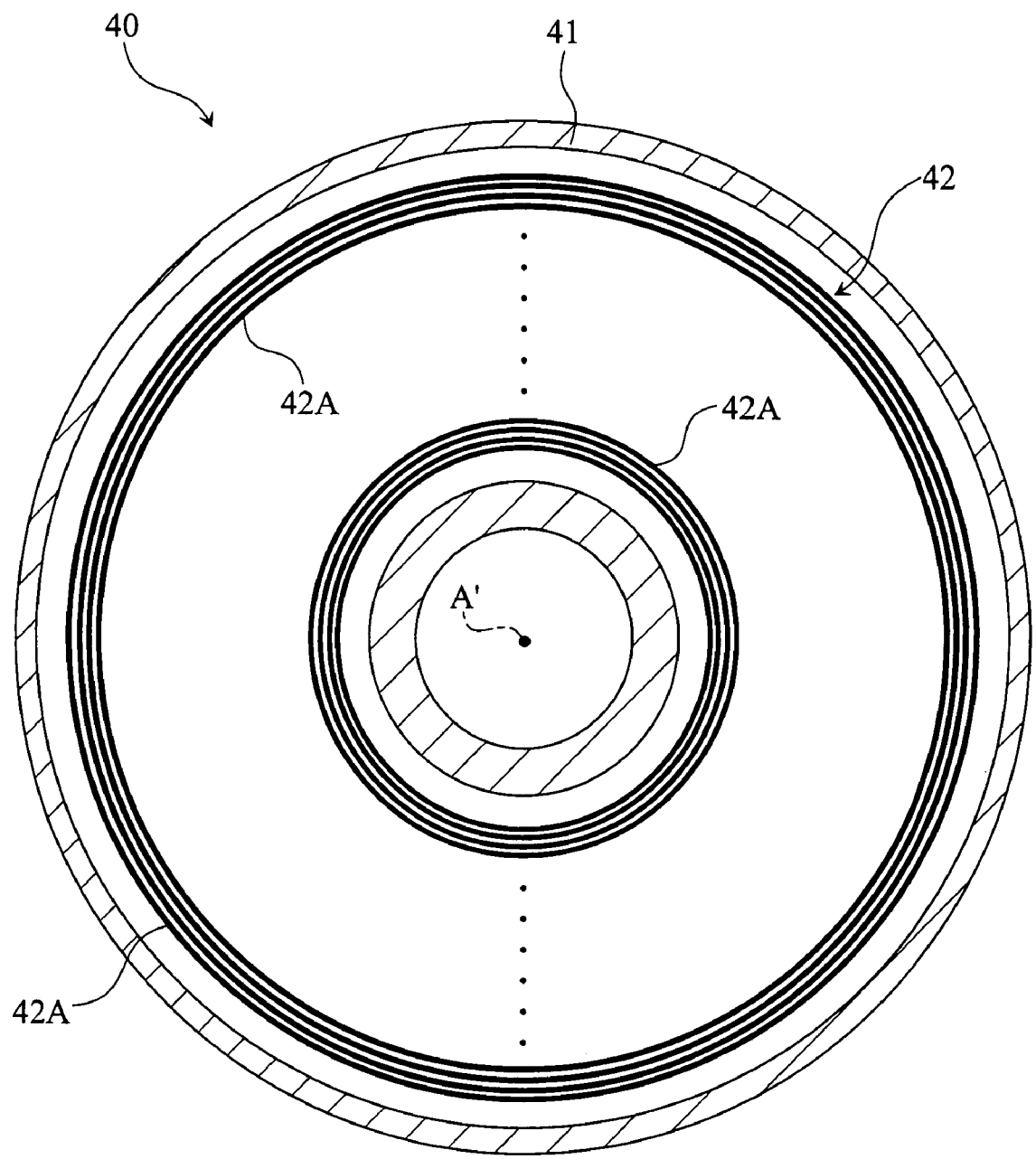
FIG. 21 is a plan view showing a conventional magnetic disk, which is a discrete track medium.
Figure 22:
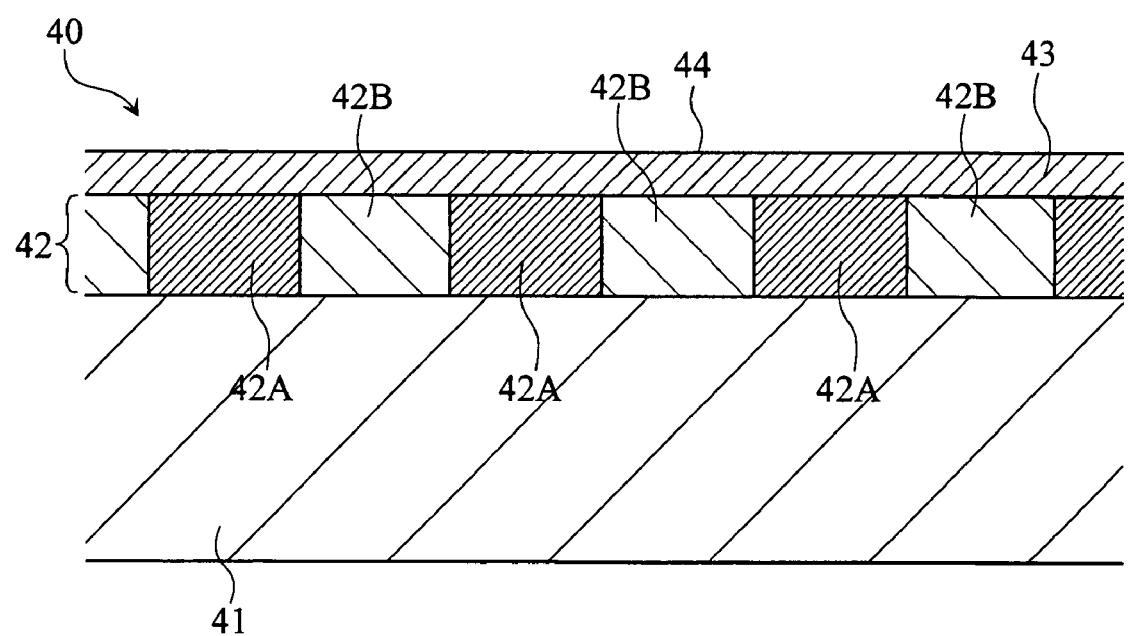
FIG. 22 is an enlarged fragmentary cross-sectional view of the magnetic disk shown in FIG. 21.

A vibrating sample magnetometer (VSM) was employed to measure the vertical coercivity and in-plane coercivity of the CoCrPt—$SiO_2$ layer of the layered structure sample according to this working example. The result is shown in the graphs of FIGS. 17 and 18. In the graph of FIG. 17, the horizontal axis represents the oxygen-exposure time (seconds) of the Ru layer, after the formation thereof and before the formation of the CoCrPt—$SiO_2$ layer (the oxygen-exposure was not performed in the working example 1), and the vertical axis represents the vertical coercivity (Oe), and the measurement result with respect to the layered structure sample of this working example is indicated by a plot E1. In the graph of FIG. 18, the horizontal axis represents the oxygen-exposure time (seconds) of the Ru layer, after the formation thereof and before the formation of the CoCrPt—$SiO_2$ layer and the vertical axis represents the in-plane coercivity (Oe), and the measurement result with respect to the layered structure sample of this working example is indicated by a plot E1'.

Working Example 2

A layered structure as that shown in FIG. 16 was prepared as a layered structure sample for the working example 2. To make up the layered structure sample, firstly a CoZrNb layer of 100 nm in thickness and a Ru layer of 50 nm in thickness were sequentially formed on a glass substrate, through similar methods to those employed in the working example 1. Oxygen was introduced into the chamber and increased the pressure in the chamber to 0.2 Pa, and the Ru layer was exposed to oxygen for one second. Then oxygen was substantially removed from the chamber and set the degree of vacuum at $1\times10^{-6}$ Pa, after which the sputtering process was performed to deposit $Co_{77}Cr_{20}Pt_3$—$SiO_2$ on the Ru layer thus forming a CoCrPt—$SiO_2$ layer of 15 nm in thickness. That is how the layered structure sample for this working example was prepared. With respect to the layered structure sample for this working example, the vertical coercivity and in-plane coercivity of the CoCrPt—$SiO_2$ layer were measured similarly to the layered structure sample for the working example 1. The result is indicated by plots E2, E2' in the graphs of FIGS. 17 and 18, respectively.

Working Examples 3 to 7

Layered structure samples for the working examples 3 to 7 were prepared similarly to that of the working example 1, except that the oxygen exposure time of the Ru layer was set at two seconds (working example 3), four seconds (working example 4), eight seconds (working example 5), 16 seconds (working example 6), and 30 seconds (working example 7), instead of one second. With respect to the layered structure samples for the respective working examples, the vertical coercivity and in-plane coercivity of the CoCrPt—$SiO_2$ layer were measured similarly to the layered structure sample for the working example 1. The measurement result of the vertical coercivity from the working examples 3 to 7 is indicated by plots E3 to E7 in the graph of FIG. 17, and the measurement result of the in-plane coercivity from the working examples 3 to 7 is indicated by plots E3' to E7' in the graph of FIG. 18.

<Evaluation>

From the graph of FIG. 17, it is understood that because of the oxygen exposure of the Ru layer corresponding to the seed layer, the vertical coercivity of the CoCrPt—$SiO_2$ layer on the Ru layer, corresponding to the magnetic film on the seed layer, drastically attenuates to approx. 1000 Oe, from approx. 3500 Oe. In contrast from the graph of FIG. 18, it is understood that because of the oxygen exposure of the Ru layer corresponding to the seed layer, the in-plane coercivity of the CoCrPt—$SiO_2$ layer on the Ru layer sharply increases to approx. 1600 Oe from substantially 0 Oe. This, from FIGS. 17 and 18, it is understood that because of the oxygen exposure of the Ru layer corresponding to the seed layer, the magnetic easy axis is shifted from a vertically aligned state to a generally isotropically aligned state in the CoCrPt—$SiO_2$ layer which corresponds to the magnetic film formed on the seed layer.

Working Example 8

A magnetic disk having the multilayer structure as shown in FIG. 19 according to the first embodiment was prepared for this working example.

To prepare the magnetic disk for this working example, firstly the sputtering process was performed to deposit CoZrNb of a predetermined composition ratio on a disk-shaped glass substrate of 65 mm in outer diameter, thus forming a CoZrNb layer of 100 nm in thickness, as the soft magnetic layer. The sputtering process was performed in a predetermined chamber, utilizing a predetermined sputtering apparatus. This also applies to the subsequent sputtering processes. The gas pressure in the chamber was set at 0.8 Pa.

Then Ru was deposited by sputtering, thus to form a Ru layer of 50 nm in thickness, on the soft magnetic layer. For this sputtering process, the gas pressure in the chamber was set at 0.6 Pa.

Then the achieved degree of vacuum of the chamber was set at $1\times10^{-6}$ Pa, and a mask with an oxygen-permeable film, corresponding to the mask 21, was brought into close contact with the seed layer, as described referring to FIG. 3(c). The mask body includes an opening corresponding to a pattern of the non-recording magnetic region to be subsequently formed. Then oxygen was introduced into the chamber, by which the pressure in the chamber was increased to 0.2 Pa. By such oxygen exposure, the region on the seed layer not in contact with the mask body was oxidized, so that the non-oxidized region and the oxidized region were formed on the seed layer surface.

The oxygen was substantially removed from the chamber thus to reset the achieved degree of vacuum of the chamber at $1\times10^{-6}$ Pa, and the mask was removed. Then the sputtering process was performed so as to deposit $Co_{77}Cr_{20}Pt_3$—$SiO_2$ on the seed layer, thus forming a CoCrPt—SiO$_2$ layer of 15 nm in thickness, as the recording layer.

Then a CVD process was performed so as to deposit diamond-like carbon (hereinafter, DLC) on the recording layer, thus forming a DLC layer of 2 nm in thickness as the cover layer 15. In this process, the pressure in the chamber was set at 0.4 Pa. That is how the magnetic disk for this working example was prepared.

Working Example 9

Another magnetic disk having the multilayer structure as shown in FIG. 19 according to the first embodiment was prepared for this working example.

To prepare the magnetic disk for this working example, firstly a CoZrNb layer of 100 nm in thickness, corresponding to the soft magnetic layer, and a Ru layer of 50 nm in thickness corresponding to the seed layer were sequentially formed on a glass substrate, in a similar manner to that employed in the working example 8.

Then oxygen was introduced into the chamber, by which the pressure in the chamber was set at 0.2 Pa. By such oxygen exposure, the entire exposed surface of the seed layer was oxidized and the oxidized coating was thus formed.

The oxygen was then substantially removed from the chamber thus to set the achieved degree of vacuum of the chamber at $1 \times 10^{-6}$ Pa, and a mask with a hydrogen-permeable film, corresponding to the mask 22, was brought into close contact with the oxidized coating, hence the seed layer, as described referring to FIG. 5(c). The mask body includes an opening corresponding to a pattern of the recording magnetic region to be subsequently formed. Then hydrogen acting as the reduction gas was introduced into the chamber, by which the pressure in the chamber was increased to 10 Pa. By such hydrogen exposure, the region on the seed layer (oxidized coating) not in contact with the mask body was reduced, so that the non-oxidized region and the oxidized region were formed on the seed layer surface.

The hydrogen was substantially removed from the chamber, and the sputtering process was performed so as to deposit Co$_{77}$Cr$_{20}$Pt$_3$—SiO$_2$ on the seed layer, thus forming a CoCrPt—SiO$_2$ layer of 15 nm in thickness, as the recording layer.

Then a CVD process was performed so as to deposit DLC on the recording layer, thus forming a DLC layer of 2 nm in thickness as the cover layer 15. In this process, the pressure in the chamber was set at 0.4 Pa. That is how the magnetic disk for this working example was prepared.

Working Example 10

A magnetic disk having the multilayer structure as shown in FIG. 20 according to the second embodiment was prepared for this working example.

To prepare the magnetic disk for this working example, firstly the sputtering process was performed to deposit CoZrNb of a predetermined composition ratio on a disk-shaped glass substrate of 65 mm in outer diameter, thus forming a CoZrNb layer of 100 nm in thickness, as the soft magnetic layer. The gas pressure in the chamber was set at 0.8 Pa.

Then Ta was deposited by sputtering, thus to form a Ta layer of 50 nm in thickness corresponding to the pre-seed layer, on the soft magnetic layer. For this sputtering process, the gas pressure in the chamber was set at 0.8 Pa.

Then the achieved degree of vacuum of the chamber was set at $1 \times 10^{-6}$ Pa, and a mask with an oxygen-permeable film, corresponding to the mask 21, was brought into close contact with the pre-seed layer, as described referring to FIG. 10(c). The mask body includes an opening corresponding to a pattern of the non-recording magnetic region to be subsequently formed. Then oxygen was introduced into the chamber, by which the pressure in the chamber was increased to 0.2 Pa. By such oxygen exposure, the region on the pre-seed layer not in contact with the mask body was oxidized, so that the non-oxidized region and the oxidized region were formed on the pre-seed layer surface.

The oxygen was substantially removed from the chamber thus to reset the achieved degree of vacuum of the chamber at $1 \times 10^{-6}$ Pa, and the mask was removed. Then the sputtering process was performed so as to deposit Ru on the pre-seed layer, thus forming a Ru layer of 20 nm in thickness, as the seed layer.

Again, the sputtering process was performed so as to deposit Co$_{77}$Cr$_{20}$Pt$_3$—SiO$_2$ on the seed layer, thus forming a CoCrPt—SiO$_2$ layer of 15 nm in thickness, as the recording layer. For this sputtering process, the gas pressure in the chamber was set at 0.6 Pa.

Then a CVD process was performed so as to deposit DLC on the recording layer, thus forming a DLC layer of 2 nm in thickness as the cover layer 15. In this process, the pressure in the chamber was set at 0.4 Pa. That is how the magnetic disk for this working example was prepared.

The invention claimed is:

1. A magnetic recording medium comprising:
   a continuous recording layer; and
   a seed layer including a surface held in contact with the recording layer;
   wherein the seed layer includes an oxidized region and a non-oxidized region in said surface of the seed layer,
   wherein the recording layer includes a recording magnetic region and a non-recording magnetic region, the recording magnetic region and non-recording magnetic region of the recording layer containing a same magnetic metal, the recording magnetic region being located on the non-oxidized region and having perpendicular magnetic anisotropy, the non-recording magnetic region being located on the oxidized region and having a different magnetic structure from the recording magnetic region; and
   wherein the non-recording magnetic region has longitudinal magnetic anisotropy.

2. A magnetic recording medium comprising:
   a continuous recording layer;
   a pre-seed layer; and
   a seed layer provided between the recording layer and the pre-seed layer;
   wherein the pre-seed layer has a surface held in contact with the seed layer and includes an oxidized region and a non-oxidized region in said surface of the pre-seed layer,
   wherein the recording layer includes a recording magnetic region and a non-recording magnetic region, the recording magnetic region and non-recording magnetic region of the recording layer containing a same magnetic metal, the recording magnetic region having perpendicular magnetic anisotropy and corresponding in position to the non-oxidized region, the non-recording magnetic region corresponding in position to the oxidized region and having a different magnetic structure from the recording magnetic region; and
   wherein the non-recording magnetic region has longitudinal magnetic anisotropy.

3. A magnetic recording medium comprising:

a substrate;

a continuous recording layer formed over the substrate, the recording layer including a plurality of concentric recording magnetic tracks and a plurality of concentric non-recording magnetic tracks alternate with the recording magnetic tracks, the recording magnetic tracks and non-recording magnetic tracks of the recording layer containing a same magnetic metal; and an intermediate layer formed between the substrate and the recording layer;

wherein the intermediate layer includes a plurality of oxidized regions corresponding in position to the plurality of non-recording magnetic tracks and a plurality of non-oxidized regions corresponding in position to the plurality of recording magnetic tracks;

wherein each of the non-recording magnetic tracks has perpendicular magnetic anisotropy, each of the non-recording magnetic tracks having a different magnetic structure from the recording magnetic tracks; and wherein each of the non-recording magnetic tracks has longitudinal magnetic anisotropy.

4. The magnetic recording medium according to claim 3, wherein the intermediate layer is a seed layer made of a metal selected from the group consisting of Ru, Pt, Pd and Ti, or an alloy containing the selected metal.

5. The magnetic recording medium according to claim 3, wherein the intermediate layer is a pre-seed layer made of an element selected from the group consisting of Ta, Pt, Ni, Fe, Ti, W, Mo, B, C, Si and Ge, or a compound containing the selected element.

6. The magnetic recording medium according to claim 3, wherein the recording layer is entirely made of a magnetic material containing Co.

7. The magnetic recording medium according to claim 6, wherein the magnetic material is selected from the group consisting of $CoCrPt$—$SiO_2$, $CoCr$—$SiO_2$, and $CoPt$—$Sio_2$.

* * * * *